(12) United States Patent  
Kuppuswamy et al.

(10) Patent No.: US 12,048,998 B2  
(45) Date of Patent: *Jul. 30, 2024

(54) SYSTEMS AND METHODS FOR ESTIMATING SHAPE, CONTACT FORCES, AND POSE OF OBJECTS MANIPULATED BY ROBOTS HAVING COMPLIANT CONTACT AND GEOMETRY SENSORS

(71) Applicant: TOYOTA RESEARCH INSTITUTE, INC., Los Altos, CA (US)

(72) Inventors: Naveen Kuppuswamy, Arlington, MA (US); Alejandro M. Castro, Cambridge, MA (US); Alexander Alspach, Somerville, MA (US)

(73) Assignee: Toyota Research Institute, Inc., Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/202,721

(22) Filed: May 26, 2023

(65) Prior Publication Data

US 2023/0294299 A1   Sep. 21, 2023

Related U.S. Application Data

(63) Continuation of application No. 16/774,488, filed on Jan. 28, 2020, now Pat. No. 11,667,039.

(51) Int. Cl.
*B25J 13/08* (2006.01)
*B25J 15/00* (2006.01)
(Continued)

(52) U.S. Cl.
CPC ......... *B25J 13/082* (2013.01); *B25J 15/0033* (2013.01); *B25J 19/022* (2013.01); *B25J 19/023* (2013.01); *G01L 5/0061* (2013.01)

(58) Field of Classification Search
CPC .... B25J 13/082; B25J 13/081; B25J 15/0033; B25J 15/0023; B25J 19/022; B25J 19/023;
(Continued)

(56) References Cited

U.S. PATENT DOCUMENTS 8,286,509 B2   10/2012   Igarashi et al.
9,630,316 B2   4/2017   Konolige et al.
(Continued)

FOREIGN PATENT DOCUMENTS

CN     107249833 A     10/2017
CN     108015789 A     5/2018
(Continued)

OTHER PUBLICATIONS

Kappassov, Zhanat et al. "Tactile sensing in dexterous robot hands—Review." Robotics and Autonomous Systems. Elsevier, 2015. Web. http://www.isir.upmc.fr/files/2015ACLI3684.pdf.
(Continued)

*Primary Examiner* — Stephen A Vu
(74) *Attorney, Agent, or Firm* — Dinsmore & Shohl LLP

(57) ABSTRACT

Systems and methods for estimating deformation and field of contact forces are described. A method includes generating a reference configuration including reference points in space. The reference configuration corresponds to an initial shape of a membrane prior to contact with the manipuland. The method further includes receiving raw data from a TOF device. The raw data includes points in space measured by the TOF device and indicating deformation of the membrane due to contact with the manipuland. The method further includes determining deformation of the membrane that best approximates a current configuration in a least squares sense while satisfying a discrete physical model enforced as a linear constraint that corresponds to a linearized physical
(Continued)

model of the deformation that is discretized with an FEM, linearizing the relationship, and estimating deformation and field of contact forces by solving a least squares formulation with physical constraints cast as a sparse quadratic program.

18 Claims, 13 Drawing Sheets

(51) Int. Cl.
*B25J 19/02* (2006.01)
*G01L 5/00* (2006.01)

(58) Field of Classification Search
CPC ...... B25J 9/1682; G01L 5/0061; G01L 5/009; G01L 1/24
See application file for complete search history.

(56) References Cited

U.S. PATENT DOCUMENTS

| | | | |
|---|---|---|---|
| 9,757,862 B2 | 9/2017 | Alt et al. | |
| 11,667,039 B2* | 6/2023 | Kuppuswamy | ....... G01L 5/0061 702/41 |

| | | | |
|---|---|---|---|
| 2017/0028561 A1 | 2/2017 | Yamada et al. | |
| 2017/0080571 A1 | 3/2017 | Wagner et al. | |
| 2018/0297214 A1 | 10/2018 | Lessing et al. | |

FOREIGN PATENT DOCUMENTS

| | | |
|---|---|---|
| EP | 2404712 A1 | 11/2012 |
| KR | 10-2017-010754 A | 9/2017 |
| WO | 2017134092 A1 | 8/2017 |
| WO | 2018063100 A2 | 4/2018 |

OTHER PUBLICATIONS

Gong, Daoxiong et al. "A Pneumatic Tactile Sensor for Co-Operative Robots." Sensors (Basel, Switzerland), Nov. 10, 2017. Web. https://pdfs.semanticscholar.org/487c/9e82153de3ec-07919d73f55aaa4efaa24f4e.pdf.

* cited by examiner

SYSTEMS AND METHODS FOR ESTIMATING SHAPE, CONTACT FORCES, AND POSE OF OBJECTS MANIPULATED BY ROBOTS HAVING COMPLIANT CONTACT AND GEOMETRY SENSORS

CROSS-REFERENCE TO RELATED APPLICATION

The present application claims priority to U.S. Non-Provisional patent application Ser. No. 16/774,488, filed Jan. 28, 2020 and entitled "SYSTEMS AND METHODS FOR ESTIMATING SHAPE, CONTACT FORCES, AND POSE OF OBJECTS MANIPULATED BY ROBOTS HAVING COMPLIANT CONTACT AND GEOMETRY SENSORS," the entire contents of which is incorporated herein by reference in its entirety.

TECHNICAL FIELD

Embodiments described herein generally relate to contact sensors and, more particularly, to deformable contact and geometry sensors capable of detecting contact and a geometry of an object that is grasped by a robot having end effectors with compliant inflatable membranes.

BACKGROUND

Contact sensors are used to determine whether or not one object is in physical contact with another object. For example, robots often use contact sensors to determine whether a portion of the robot is in contact with an object. Control of the robot may then be based at least in part on signals from one or more contact sensors.

SUMMARY

In one aspect, a method of estimating deformation and a field of contact forces causing deformation of at least one deformable sensor comprising a deformable membrane and a time-of-flight imaging device with a field of contact forces caused by a manipuland held by a robot comprising the at least one deformable sensor includes generating, by a processing device, a reference configuration comprising a plurality of reference points in space. The reference configuration corresponds to an initial shape of the deformable membrane prior to contact with the manipuland. The method further includes receiving, by the processing device, raw data from the time-of-flight imaging device. The raw data includes a plurality of points in space measured by the time-of-flight imaging device and indicating a current state of deformation of the deformable membrane due to contact with the manipuland. The method further includes determining, by the processing device, the deformation of the deformable membrane that best approximates a current configuration in a least squares sense while satisfying a discrete physical model enforced as a linear constraint that corresponds to a linearized physical model of the deformation of the deformable membrane that is discretized with a Finite Element Method (FEM). The method further includes modeling, by the processing device, internal pressure changes of the deformable sensor due to contact between the manipuland and the deformable membrane using an ideal gas law that imposes a relationship between the internal pressure and a volume of the deformable sensor. The method further includes linearizing, by the processing device, the relationship to obtain a linearized pressure-volume relationship. The method further includes estimating, by the processing device, the deformation and the field of contact forces by solving a least squares formulation with the linearized physical constraints of the linearized pressure-volume relationship cast as a sparse quadratic program.

In another aspect, a sensing system includes at least one deformable sensor. The deformable sensor includes a deformable membrane and a time-of-flight imaging device. The sensing system further includes a processing device communicatively coupled to the time-of-flight imaging device and a non-transitory, processor-readable storage medium communicatively coupled to the processing device. The non-transitory, processor-readable storage medium includes one or more programming instructions thereon that, when executed, cause the processing device to generate a reference configuration including a plurality of reference points in space. The reference configuration corresponds to an initial shape of the deformable membrane prior to contact with the manipuland. The non-transitory, processor-readable storage medium further includes one or more programming instructions thereon that, when executed, cause the processing device to receive raw data from the time-of-flight imaging device. The raw data includes a plurality of points in space measured by the time-of-flight imaging device and indicating a current state of deformation of the deformable membrane due to contact with the manipuland. The non-transitory, processor-readable storage medium further includes one or more programming instructions thereon that, when executed, cause the processing device to determine the deformation of the deformable membrane that best approximates a current configuration in a least squares sense while satisfying a discrete physical model enforced as a linear constraint that corresponds to a linearized physical model of the deformation of the deformable membrane that is discretized with a Finite Element Method (FEM). The non-transitory, processor-readable storage medium further includes one or more programming instructions thereon that, when executed, cause the processing device to model internal pressure changes of the deformable sensor due to contact between the manipuland and the deformable membrane using an ideal gas law that imposes a relationship between the internal pressure and a volume of the deformable sensor. The non-transitory, processor-readable storage medium further includes one or more programming instructions thereon that, when executed, cause the processing device to linearize the relationship to obtain a linearized pressure-volume relationship and estimate the deformation and the field of contact forces by solving a least squares formulation with the linearized physical constraints of the linearized pressure-volume relationship cast as a sparse quadratic program.

In yet another aspect, a robot system includes a robot having an end effector having at least one deformable sensor thereon. The deformable sensor includes a deformable membrane and a time-of-flight imaging device. The robot system further includes a processing device communicatively coupled to the time-of-flight imaging device and a non-transitory, processor-readable storage medium communicatively coupled to the processing device. The non-transitory, processor-readable storage medium includes one or more programming instructions thereon that, when executed, cause the processing device to generate a reference configuration including a plurality of reference points in space. The reference configuration corresponds to an initial shape of the deformable membrane prior to contact with the manipuland. The non-transitory, processor-readable storage medium further includes one or more programming instructions thereon that, when executed, cause the processing device to receive raw data from the time-of-flight imaging device. The raw data includes a plurality of points in space measured by the time-of-flight imaging device and indicating a current state of deformation of the deformable membrane due to contact with the manipuland. The non-transitory, processor-readable storage medium further includes one or more programming instructions thereon that, when executed, cause the processing device to determine the deformation of the deformable membrane that best approximates a current configuration in a least squares sense while satisfying a discrete physical model enforced as a linear constraint that corresponds to a linearized physical model of the deformation of the deformable membrane that is discretized with a Finite Element Method (FEM). The non-transitory, processor-readable storage medium further includes one or more programming instructions thereon that, when executed, cause the processing device to model internal pressure changes of the deformable sensor due to contact between the manipuland and the deformable membrane using an ideal gas law that imposes a relationship between the internal pressure and a volume of the deformable sensor. The non-transitory, processor-readable storage medium further includes one or more programming instructions thereon that, when executed, cause the processing device to linearize the relationship to obtain a linearized pressure-volume relationship and estimate the deformation and the field of contact forces by solving a least squares formulation with the linearized physical constraints of the linearized pressure-volume relationship cast as a sparse quadratic program.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
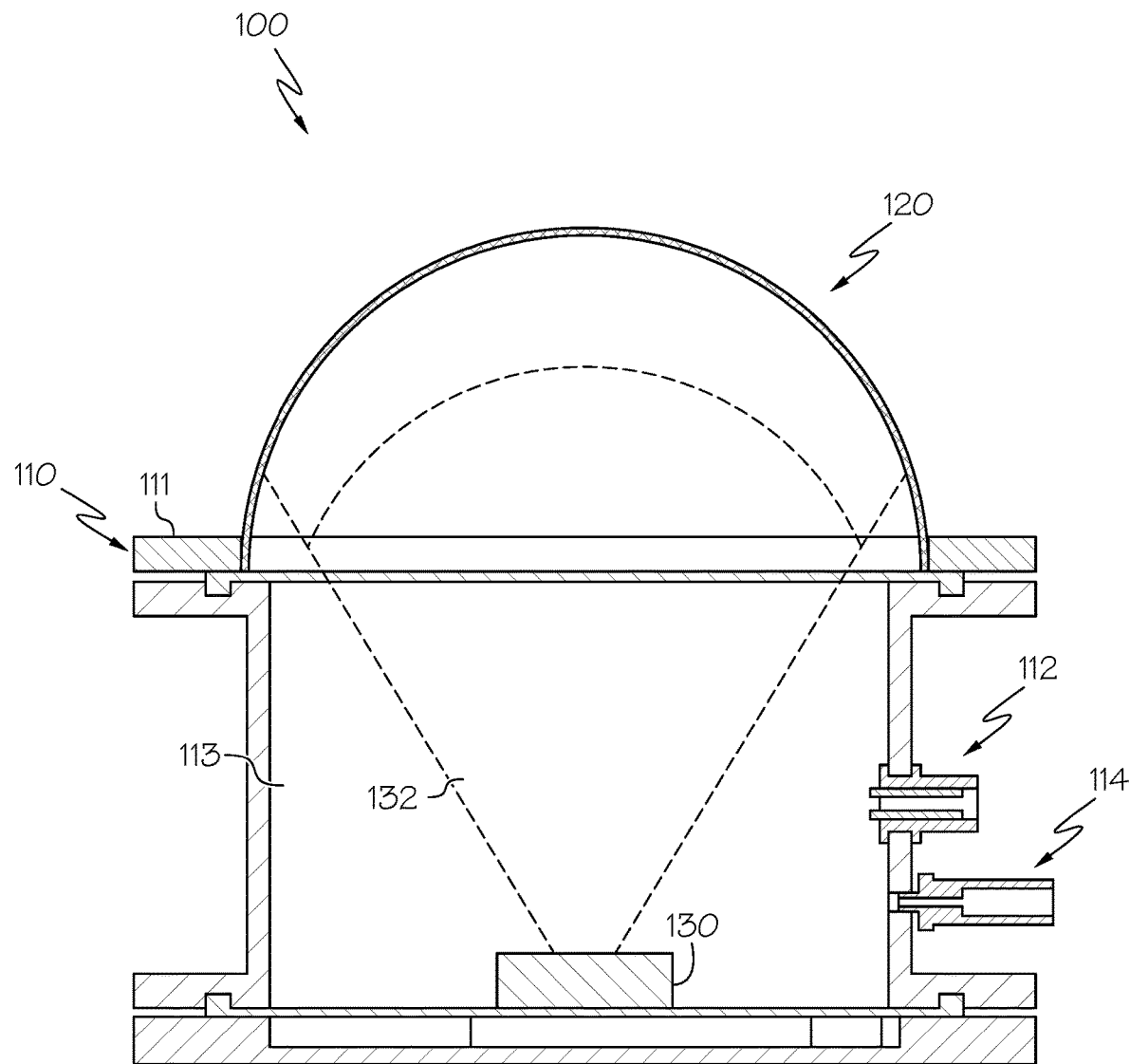
FIG. 1 schematically depicts a side cross-sectional view of an illustrative deformable sensor according to one or more embodiments described and illustrated herein.

The present disclosure relates to modeling a behavior of a highly deformable dense-geometry sensor in its interaction with objects. The modeling described herein can be used to predict the deformation of a highly deformable mesh given a pose and a geometry of a contacting rigid object. Such modeling may be used to develop a model-based fast approximation to estimate a contact patch given an interaction of a sensor with arbitrary objects. Such an inverse model can be identified through experiments and is formulated as a sparse quadratic program (QP) that can be solved efficiently online. The model described herein serves as a first stage of a pose estimation pipeline for robot manipulation. Such a pipeline is demonstrated through tracking resultant contact patches on a dual-arm contact-rich manipulation problem of screwing an over-sized nut on a bolt and through pose-estimation using an iterative closest point (ICP) based tracker. The results presented herein demonstrate a pathway towards realizing soft robots with highly compliant surfaces that can perform complex manipulation tasks in real-world environments.

Robots are commonly equipped with end effectors that are particularly configured to perform certain tasks. For example, an end effector of a robotic arm may be configured as a human hand, or as a two-fingered gripper. However, robots do not have varying levels of touch sensitivity as do humans. End effectors may include sensors such as pressure sensors, but such sensors provide limited information about the object that is in contact with the end effector. Thus, the robot may damage a target object by using too much force, or drop the object because it does not properly grasp the object.

Tactile sensing is essential to understand when, where, and how contact is made, as uncertainty inevitably results in unexpected and unpredicted contact. For example, the immense tactile power of human fingertips allows humans to locate and identify objects, securely hold the objects, and accurately manipulate the objects in uncertain conditions.

For robots, classical touch sensing relies often on sparse and noisy force information from contact, which is so far insufficient to identify object type or track object pose. Furthermore, sparse force sensing poorly captures the contact patch behavior. Approaches using machine learning or fusing contact sensing with other sensor modalities are ultimately limited by the lack of information available and the complexity of the models required. A new class of dense-geometry sensors has recognized the power of soft tactile sensing (e.g., gelsight, gelslim, yonglae park, tactip, soft bubble), with new sensor designs that capture dense information about the geometry of contact. From the observed geometry, contact locations, forces, slip, and other essential properties can be estimated. Observing contact geometry allows the tactile sensing problem to be converted into a 3D-perception problem.

Inspired by the human fingertip, the soft-bubble is a highly compliant dense-geometry tactile sensor. As described herein, this sensor places a time-of-flight camera behind and air-filled membrane, (e.g., the bubble, which provides a high-resolution depth image of the membrane's deformation due to contact). Mounted as an end-effector on a robotic arm (or as an end-effector on each of a plurality of robotic arms), the bubbles serve as oversized fingertips that allow a robot to make and sense contact while manipulating. The friction and ability to deform around an object passively provides a stable, robust grasp while the depth image of the bubble's internal surface provides information about the location and type of contact, much like human fingertips. These depth images have been used to classify and estimate the pose of objects being manipulated. The extreme compliance of the bubble poses its own challenges, however; when an object deforms the membrane, deformation does not occur only at the patch in contact. It is thus difficult to distinguish which parts of the deformation are directly caused by the manipuland and which parts are the result of the air and membrane's behavior. Simple methods for identifying object pose, such as iterative closest point (ICP), often fail to find an accurate alignment when presented with such extraneous and confounding depth information.

The present disclosure includes a first principles approach, based on the theory of continuum mechanics, to modeling the deformations of the soft-bubble sensor. The present disclosure further demonstrates that the modeling accurately discriminates between object geometry and membrane deformation indirectly caused by the object being manipulated. A forward model, used for simulation, predicts the deformation of a highly deformable inflated mesh given the pose and geometry of a contacting rigid object. For a practical manipulation task, what is actually required for online modeling and control is the inverse model that identifies which parts of the measured depth image correspond to contact. The present disclosure relates to a fast approximation of the inverse model in terms of a sparse quadratic program (QP) formulation that allows for online evaluation as an initial estimator in a perception pipeline. The approximate inverse model described herein is not dependent on a geometry of the manipuland, which allows the model to be employed in any manipulation task.

Figure 13:
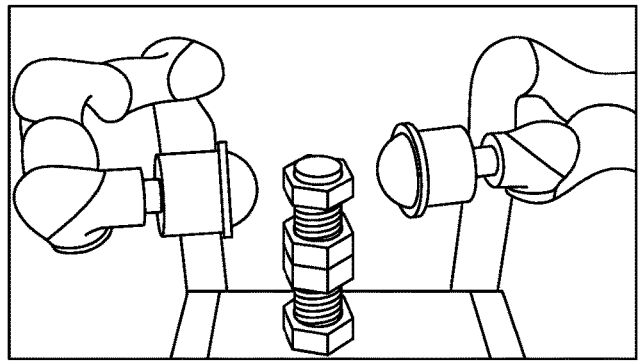
FIG. 13 schematically depicts real-time contact patch tracking in a dual arm manipulation task according to one or more embodiments shown and described herein.
Figure 13:
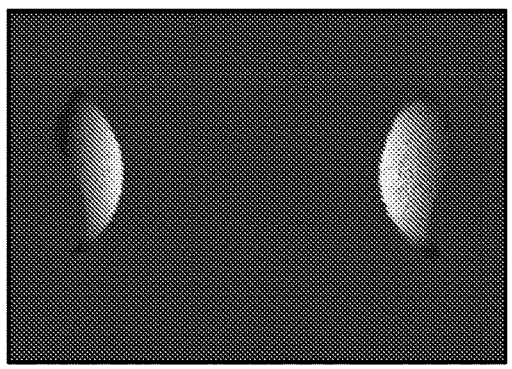
Figure 13:
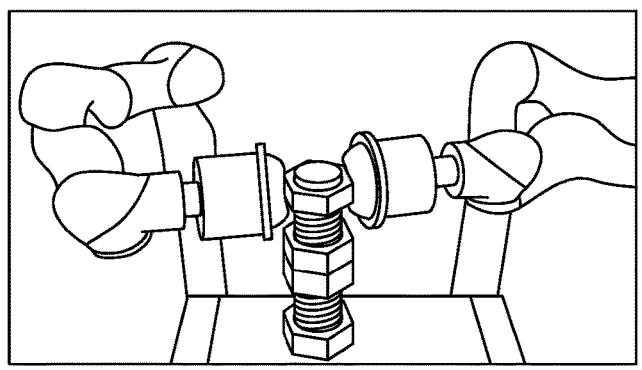
Figure 13:
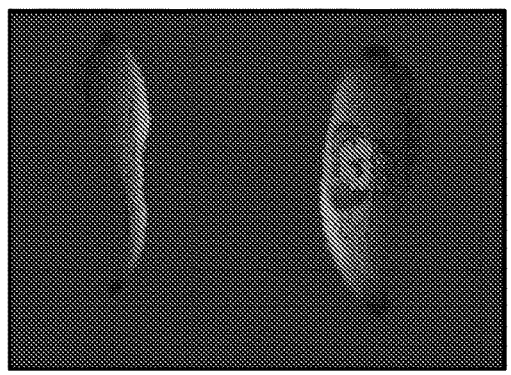
Figure 13:
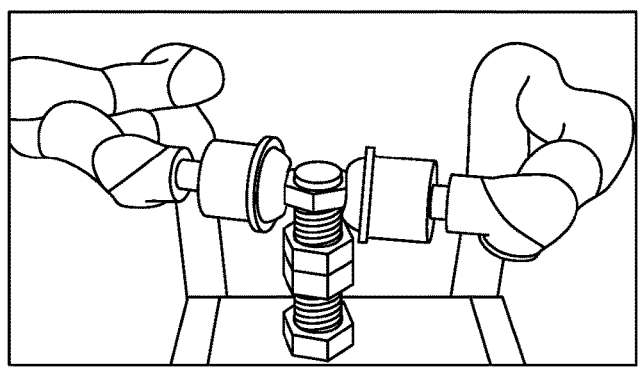
Figure 13:
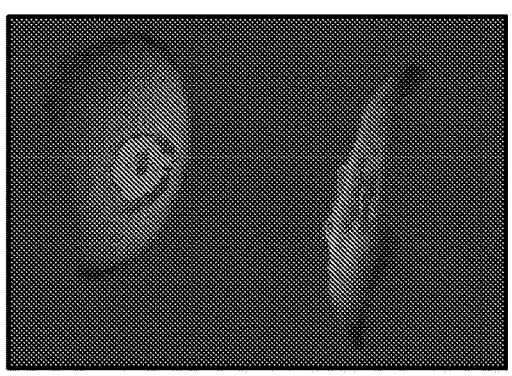

As described in greater detail herein, the present disclosure demonstrates the efficacy of the methods described herein via (i) a dual-arm rich-contact manipulation problem of screwing an oversized nut onto a bolt (e.g., as depicted in FIG. 13 for example) where contact patches are tracked online, and (ii) combine the contact patch estimation along with a conventional ICP-based tracker to robustly estimate manipuland pose. As described in greater detail herein, the results demonstrate a pathway towards realizing robots with highly compliant surfaces, performing complex manipulation tasks through continuous and rich interaction with the world.

A particular class of tactile sensors has emerged that appear ideal for characterizing the geometry of the object being sensed and thus identify the object as well as the object's pose relative to the manipulator. These high resolution dense-geometry tactile sensors, such as, for example, GelSight, GelSlim, and FingerVision, use cameras to gather large amounts of data over relatively small contact areas. GelSight, in particular, uses precise internal lighting and photometric stereo algorithms to generate height maps of contacting geometry. This 3D information can be used in a model-based framework where it is fused with external sensors, or passed into particle filters that capture the complicated contact mechanics, or used to directly sample the contact manifold as dictated by the manipuland and gripper geometries. Although analytically incorporating the contact dynamics directly into the state estimation problem has been studied, alternative data-driven approaches have increasingly gained interest, although these methods have been largely employed in the domains of slip detection, grasp stability identification, and material property discrimination.

Specifically, these data-driven approaches seek to apply machine learning-based techniques in order to simplify the well-known modelling difficulties presented by the soft deformable material interfaces of such sensors—a prime example is a claim that machine learning is necessary due to the difficulty of developing an analytical formulation for soft-sensing as well as the difficulty of repeatedly fabricating soft sensors. While data-driven methods have demonstrated their efficacy in several contemporary problems in robotics, finding an efficient analytical formulation is appealing, since analytical formulations often provide improved understanding and characterization of behavior, and are often easier to integrate into simulations and incorporate into planning and control. Of course, data-driven machine learning methods suffer from the well-known difficulty of requiring large amounts of data in order to generalize sufficiently. Data generation for a sufficient volume of training and test data can be an impractical or even infeasible process in the case of sensors that need to make contact in order to sense.

Figure 2:
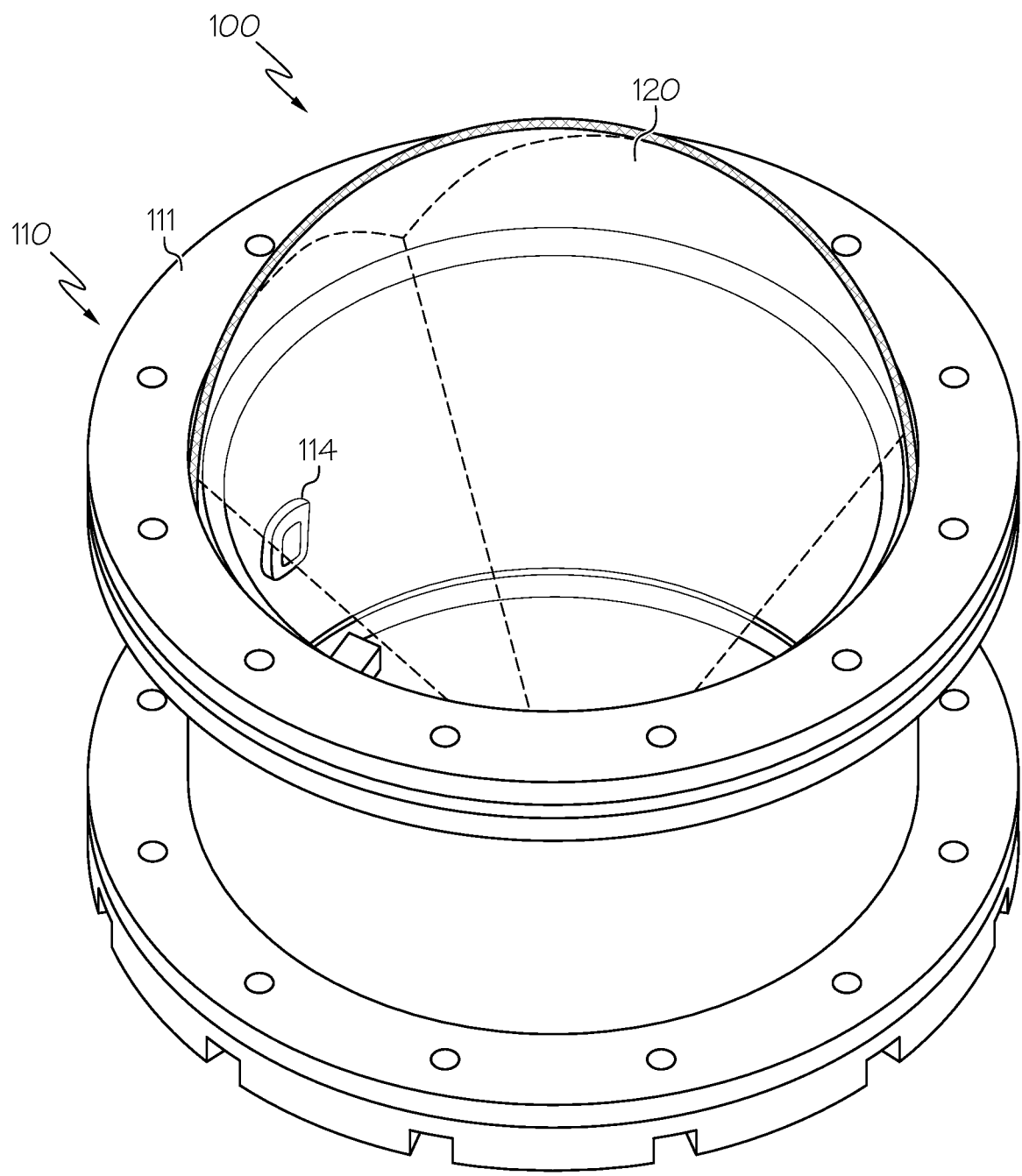
FIG. 2 schematically depicts a partial cutaway top perspective view of an illustrative deformable sensor according to one or more embodiments described and illustrated herein.

Referring now to FIGS. 1 and 2, an illustrative deformable sensor 100 is schematically illustrated. FIG. 1 is a front cutaway view of the illustrative deformable sensor 100 and FIG. 2 is a partial cutaway top perspective view of the illustrative deformable sensor 100. The illustrative deformable sensor 100 generally includes a housing 110 and a deformable membrane 120 coupled to the housing 110, such as by an upper portion 111 of the housing 110. The housing 110 and the deformable membrane 120 define an enclosure 113 that is filled with a medium via one or more passthroughs 112, which may be a valve or any other suitable mechanism. Each of the one or more passthroughs 112 may be utilized to fill or empty the enclosure 113. In one example, the medium may be a gas, such as, for example, air. Thus, air may be pumped into the enclosure 113 to a particular pressure such that the deformable membrane 120 forms a dome shape as shown in FIG. 1, although any suitable shape may be utilized in other embodiments. In another example, the medium may be a gel, such as silicone or another rubber-like substance. In some embodiments, a substance such as solid silicone may be cast in a given shape before assembly of the deformable sensor 100. In various embodiments, the medium may be anything that is transparent to an internal sensor (discussed in more detail below), such as to a wavelength of a time-of-flight sensor. The medium may include clear and/or transparent rubbers in some embodiments. In other embodiments, the medium may be a liquid. In some examples, the deformable membrane 120 and the medium within the enclosure 113 may be fabricated of the same material, such as, without limitation, silicone. In some embodiments, the deformable sensor 100 may be mountable. For example, the enclosure 113 may include brackets to be mounted any suitable object (such as a robot) or material. The deformable membrane 120 may be a latex or any other suitable material, such as a suitably thin, non-porous, rubber-like material.

The deformability of the deformable sensor 100 may be tuned and/or modified by changing the material of the deformable membrane 120 and/or the pressure within the enclosure 113. By using a softer material (e.g., soft silicone), the deformable sensor 100 may be more easily deformed. Similarly, lowering the pressure within the enclosure 113 may also cause the deformable membrane 120 to more easily deform, which may in turn provide for a more deformable sensor 100. In some embodiments, robots feature varying touch sensitivity due to varying spatial resolution and/or depth resolution.

An internal sensor 130 capable of sensing depth may be disposed within the enclosure 113, which may be measured by the depth resolution of the internal sensor 130. The internal sensor 130 may have a field of view 132 directed through the medium and toward a bottom surface of the deformable membrane 120. In some embodiments, the internal sensor 130 may be an optical sensor. As described in more detail below, the internal sensor 130 may be capable of detecting deflections of the deformable membrane 120 when the deformable membrane 120 comes into contact with an object. In one example, the internal sensor 130 is a time-of-flight sensor capable of measuring depth. The time-of-flight sensor emits an optical signal (e.g., an infrared signal) and has individual detectors (e.g., "pixels") that detect how long it takes for the reflected signal to return to the sensor. The time-of-flight sensor may have any desired spatial resolution. The greater the number of pixels, the greater the spatial resolution. The spatial resolution of the sensor disposed within the internal sensor 130 may be changed. In some cases, low spatial resolution (e.g., one "pixel" that detects a single point's displacement) may be desired. In others, a sensitive time-of-flight sensor such may be used as a high spatial resolution internal sensor 130 that provides dense tactile sensing. Thus, the internal sensor 130 may be modular because the sensors may be changed depending on the application.

A non-limiting example of a time-of-flight sensor is the Pico Flexx sold by PMD Technologies AG of Siegen, Germany. Other types of visual internal sensors include, by way of non-limiting example, stereo cameras, laser range sensors, structured light sensors/3D scanners, single cameras (such as with dots or other patterns inside), or any other suitable type of visual detector. For example, the internal sensor 130 may be configured as a stereo-camera capable of detecting deflections of the deformable membrane 120 by an object.

Any suitable quantity and/or types of internal sensors 130 may be utilized within a single deformable sensor 100 in some embodiments. In some examples, not all internal sensors 130 within a deformable sensor 100 need be of the same type. In various embodiments, one deformable sensor 100 may utilize a single internal sensor 130 with a high spatial resolution, whereas another deformable sensor 100 may use a plurality of internal sensors 130 that each have a low spatial resolution. In some embodiments, the spatial resolution of a deformable sensor 100 may be increased due to an increase in the quantity of internal sensors 130. In some examples, a decrease in the number of internal sensors 130 within a deformable sensor 100 can be compensated for by a corresponding increase in the spatial resolution of at least some of the remaining internal sensors 130. As discussed in more detail below, the aggregate deformation resolution may be measured as a function of the deformation resolution or depth resolution among the deformable sensors 100 in a portion of a robot. In some embodiments, aggregate deformation resolution may be based upon a quantity of deformable sensors in a portion of the robot and a deformation resolution obtained from each deformable sensor in that portion.

Referring to FIG. 1, a conduit 114 may be utilized in the enclosure 113 to provide power, data, and/or signals, such as to the internal sensor 130. In some embodiments, an airtight conduit may provide a passageway through which air or any other fluid (such as liquid) cannot pass. In this example, an airtight conduit may provide a passageway through which solid object (such as wires/cables) may pass through by with an airtight seal being formed around such wires/cables at each end of the airtight conduit. Other embodiments may utilize wireless internal sensors 130 to transmit and/or receive data and/or power via radio signals, as is generally understood. In embodiments where the medium is not a gas, such as silicone, the enclosure 113 and/or the conduit 114 may not necessarily be airtight.

In some embodiments, the internal sensor 130 may include one or more internal pressure sensors (barometers, pressure sensors, etc., or any combination thereof) utilized to detect the general deformation of the deformable membrane 120 through the medium. In some embodiments, the deformable sensor 100 and/or the internal sensor 130 may receive/send various signals and/or data, such as through the conduit 114 discussed above, via a wireless data transmission (Wi-Fi, Bluetooth, etc.), or via any other suitable data communication protocol. For example, pressure within a deformable sensor 100 may be specified by a pressurization parameter and may be inversely proportional to the deformability of the deformable sensor 100. In some embodiments, the deformability of a deformable sensor 100 may be modified by adjusting the pressure within the enclosure 113 or a material of the deformable membrane 120. In some embodiments, receipt of an updated parameter value may result in a real-time or delayed update (pressurization, etc.).

Figure 3:
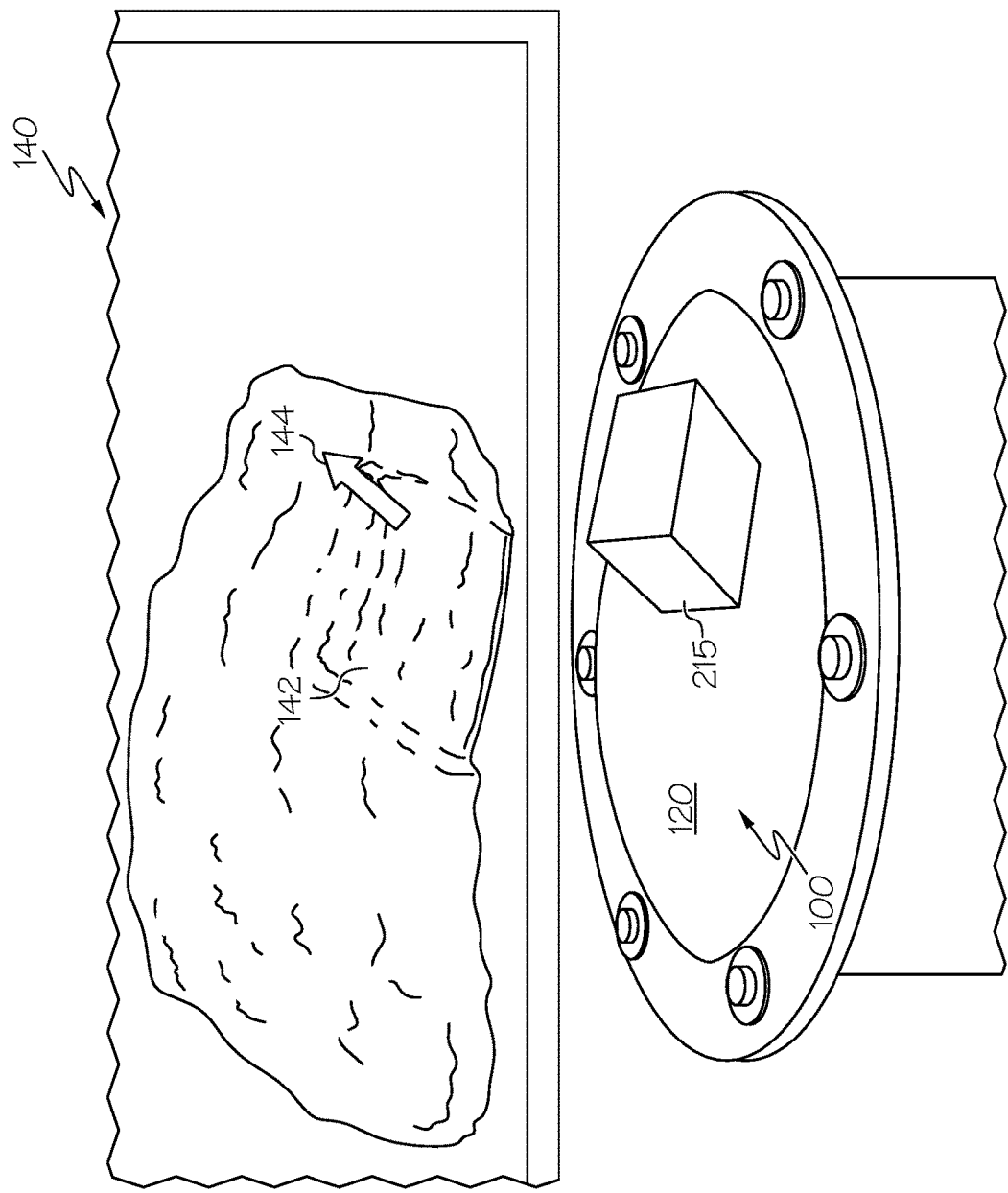
FIG. 3 schematically depicts an output of a deformable sensor on an electronic display according to one or more embodiments described and illustrated herein.

FIG. 3 depicts an image of an example object 215 displacing the deformable membrane 120 of the example deformable sensor 100. In the illustrated embodiment, a display device 140 outputs one or more images of the deformable sensor 100 in real time as the object 215 contacts and/or deforms the deformable membrane 120. It should be understood that the display device 140 is provided for illustrative purposes only, and that embodiments may be utilized without a display device. As the object 215 is pressed into the deformable membrane 120, the object 215 imparts its shape into the deformable membrane 120 such that the deformable membrane 120 conforms to the shape of the object 215. The spatial resolution of the internal sensor 130 may be such that the internal sensor 130 detects the geometry and/or pose of the displaced deformable membrane 120. For example, when the internal sensor 130 is a time-of-flight sensor, the optical signal that is reflected off of the bottom surface of the deformable membrane 120 that is being deflected by the object has a shorter time-of-flight than the optical signal that is reflected by the deformable membrane 120 at a region outside of the deflected region. Thus, a contact region 142 (or displaced region, used herein interchangeably) having a geometry and/or pose matching the shape of the object 215 may be outputted and displayed on the display device 140.

The deformable sensor 100 therefore not only may detect the presence of contact with the object 215, but also the geometry of the object 215, as described in greater detail herein. In this manner, a robot equipped with a deformable sensor 100 may determine the geometry of an object based on contact with the object, as described in greater detail herein. Additionally, a geometry and/or pose of the object 215 may also be determined based on the geometric information sensed by the deformable sensor 100. For example, a vector 144 that is normal to a surface in the contact region 142 may be displayed, such as when determining the pose of the object 215. The vector 144 may be used by a robot or other device to determine which direction a particular object 215 may be oriented, for example.

Figure 4:
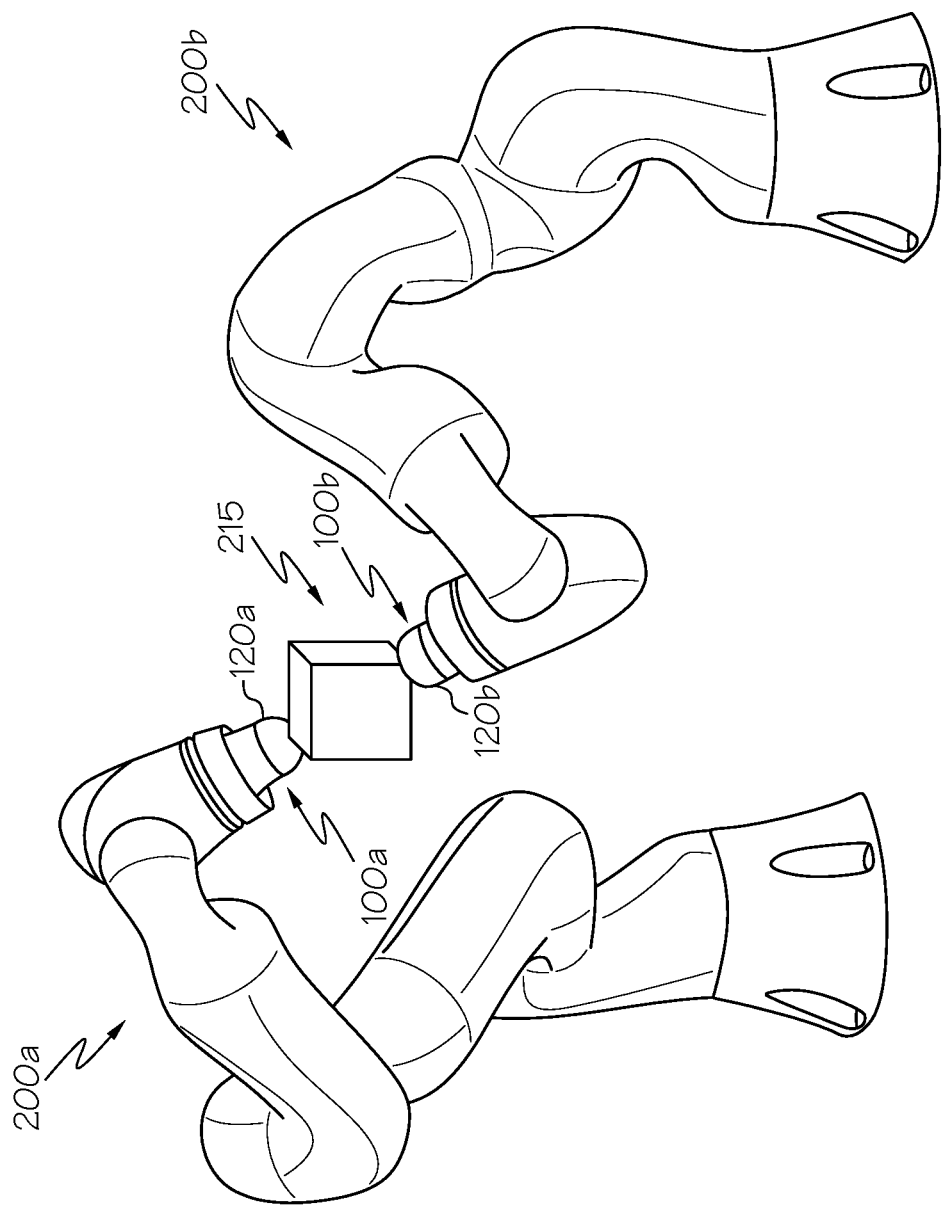
FIG. 4 schematically depicts two illustrative robots, each having a deformable sensor and manipulating an object according to one or more embodiments described and illustrated herein.

FIG. 4 schematically depicts an illustrative, non-limiting first robot 200a having a first deformable sensor 100a and an illustrative, non-limiting second robot 200b having a second deformable sensor 100b. In this illustrated example, the first robot 200a and the second robot 200b may cooperate for dual arm manipulation wherein both the first deformable sensor 100a and the second deformable sensor 100b contact the object 215. As stated herein, the deformable sensors 100a, 100b may be used as an end effector of a respective robot 200a, 200b to manipulate the object 215. The deformable sensors 100a, 100b may allow the robots 200a, 200b to handle an object 215 that is fragile due to the flexible nature of the deformable membranes 120a, 120b. Further, the deformable sensors 100a, 100b may be useful for robot-to-human contact because in some embodiments, the deformable membranes 120a, 120b may be softer and/or more flexible and/or deformable relative to other robotic end effectors that interact with humans, rather than rigid (non-deformable or nearly so) to the touch.

In addition to geometry and pose estimation, the deformable sensors 100a, 100b may be used to determine how much force the respective robots 200a, 200b (or other device) are exerting on the target object 215. While reference will be made to the first robot 200a, any such references may in some embodiments utilize second robot 200b, any other suitable devices, and/or any combinations thereof. This information may be used by the robot 200a to more accurately grasp objects 215. For example, the displacement of the deformable membrane 120a may be modeled. The model of the displacement of the deformable membrane 120a may be used to determine how much force is being applied to the target object 215. The determined force as measured by the displacement of the deformable membrane 120a may then be used to control the robot 200a to more accurately grasp objects 215. As an example, the amount of force the robot 200a (discussed in more detail below) applies to the object 215 (e.g., a fragile object) may be of importance so that the robot 200a does not break the object 215. In some embodiments, the object 215 may be assigned a softness value (or fragility value), where the robot 200a may be programmed to interact with all objects 215 based upon the softness value (which may be received at a processor, for example, from a database, server, user input, etc.). In some embodiments, a user interface may be provided to specify any suitable value (pressure within the deformable sensor 100, softness value pertaining to an object 215, etc.) for initialization and/or updating (such as on a display device 140 depicted in FIG. 3). Still referring to FIG. 4, in other embodiments, a robot 200a may be able to identify specific objects 215 (such as via object recognition in a vision system, etc.) whereby the softness value may be modified, which may lead to utilization of another deformable sensor having a more suitable deformability, aggregate spatial resolution, depth resolution, pressure, and/or material for the deformable membrane thereof. In some embodiments, a processor in a robot may receive data representing a contact region from the internal sensor thereof. In various embodiments, a processor in a robot may determine a vector normal to a surface of the object based on the data representing the contact region and utilize the vector to determine which direction the object is oriented.

Each deformable sensor 100a, 100b may have a particular spatial resolution and/or a particular depth resolution depending on its location on the respective robot 200a, 200b. Each deformable sensor 100a, 100b may act as an end effector of the respective robot 200a, 200b, and have a high spatial resolution and/or depth resolution. In some embodiments, the deformability of a deformable sensor 100a, 100b may be a function of some combination of the material of the deformable membrane 120a, 120b and the internal pressure within the respective deformable sensor 100a, 100b. In some embodiments, a deformable sensor 100a, 100b may have a clamp or other suitable attachment mechanism. For example, each deformable sensor 100a, 100b may be removably attached to a respective robot 200a, 200b, and/or a robot 200a, 200b which may have features to provide for attachment and/or removal of a deformable sensor 100a, 100b. Any suitable type of clamp, fastener, or attachment mechanism may be utilized in some embodiments.

Still referring to FIG. 4, in embodiments, a plurality of deformable sensors may be provided at various locations on either of the robots 200a, 200b. In some embodiments, the deformable sensors 100a, 100b may be disposed on a first arm portion and/or a second arm portion of a respective robot 200a, 200b (the terms "arm portion" and "portion" being used interchangeably throughout). An arm portion may have one or more deformable sensors 100a, 100b thereon, or none at all. The deformable sensors 100a, 100b may be shaped to conform to the shape of the various arm portions. It may be noted that the deformable sensors 100a, 100b described herein may take on any shape depending on the application. Deformable sensors 100a, 100b may be very flexible and thus deformable. This may be beneficial in human-robot interactions. In this way, the robots 200a, 200b may contact a person (e.g., to give the person a "hug") without causing harm due to the softness of the deformable sensors 100a, 100b and/or due to an ability to control the force of the contact with an object. The spatial resolution of one or more deformable sensors 100a, 100b in the arm portions may be high or low depending on the application. For example, deformable sensors located at or near a base portion of a robot may have low spatial resolution, and may be configured to only detect contact with a target object. The deformability of deformable sensors near the base of the robot may be set based on the application of the robot. The depth resolution and/or spatial resolution of the sensors may be varied along different parts of the robot. For example, in one portion, it may not be necessary to identify the shape and/or pose of an object coming into contact with a particular deformable sensor, as registering contact with an object may provide sufficient information, whereas contact with another portion may produce pose and/or shape information derived from the contact. The deformable sensors may be of any suitable size, which may vary even within an arm portion.

As discussed herein, a portion of a robot may provide an aggregate spatial resolution that is greater than another portion. Still referring to FIG. 4, in some embodiments, a portion of a first robot 200a may interact with an object 215 in simultaneous coordination with a portion of second robot 200b, and the aggregate spatial resolution of the portion of the first robot 200a may equal the spatial resolution of the portion of the second robot 200b. In some embodiments, deformability, such as in a portion of a robot 200a, may be determined and/or modified based upon a softness value of one or more objects 215 with which the portion interacts. In various embodiments, the aggregate spatial resolution of the portion may differ from the aggregate spatial resolution of another portion based upon both portions being configured to interact with a plurality of objects 215 having differing softness values. In some embodiments, modifying the aggregate spatial resolution of the portion may be based upon adjusting a quantity of deformable membranes 120a, 120b, a quantity of internal sensors within one or more deformable membranes 120a, 120b, and/or a spatial resolution of at least one internal sensor. In some embodiments, various portions may work in tandem. For example, as discussed above, one portion may utilize a high spatial resolution to determine an object's pose/shape and/or a pattern on the surface on the object, while another portion (on the same or a different robot) may only detect the location of contact, where these portions may communicate with each other or with another component that receives information from both portions.

Figure 5:
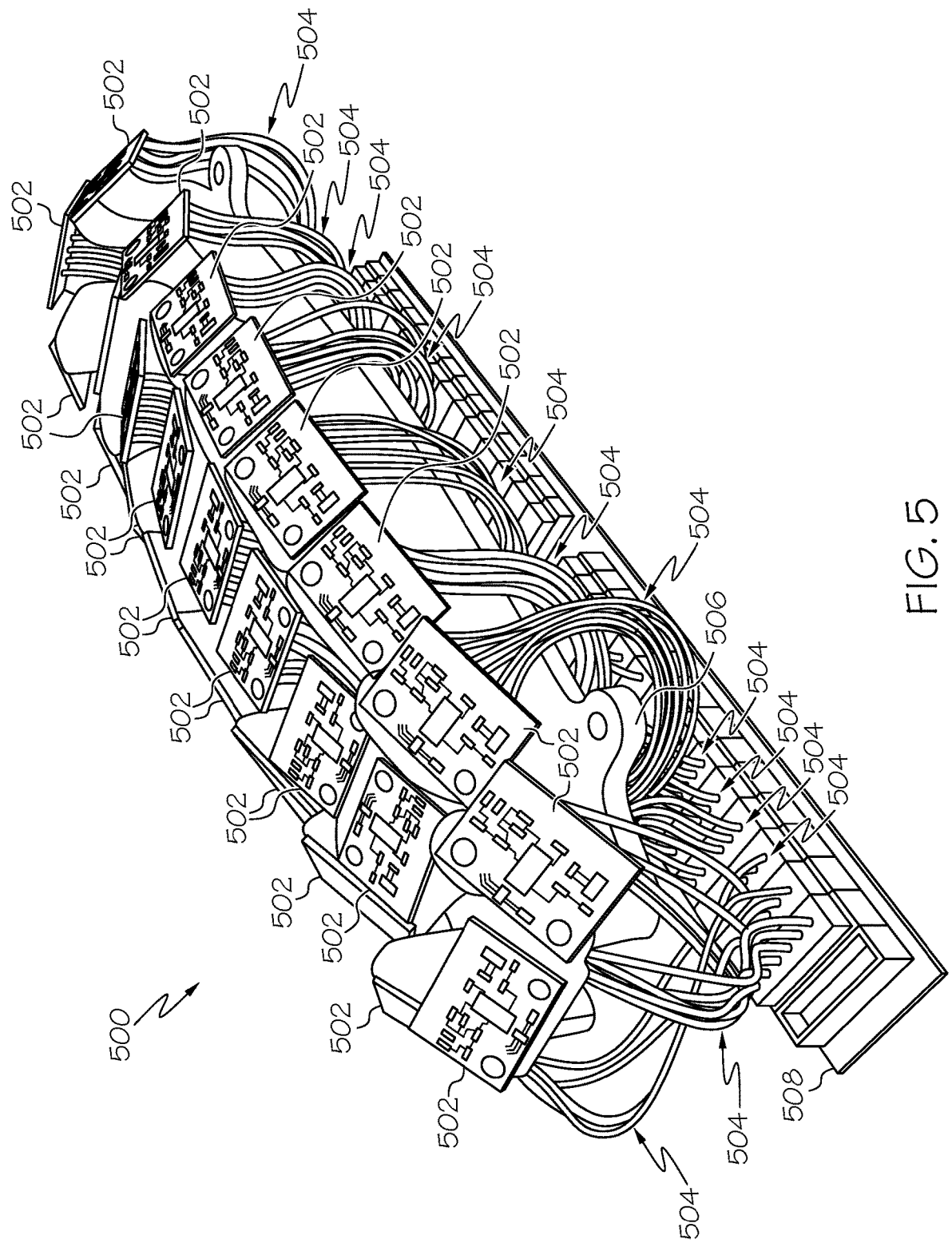
FIG. 5 schematically depicts a compound internal sensor having a plurality of sensing components according to one or more embodiments described and illustrated herein.

Referring now to FIG. 5, a compound internal sensor 500 that may be utilized within a deformable sensor (not shown) in some embodiments. The compound internal sensor 500 includes a plurality of internal sensors 502. The plurality of internal sensors 502 are not limited by this disclosure to any particular type of sensor. In some embodiments, such as the embodiment depicted in FIG. 5, each of the plurality of internal sensors 502 may be time-of-flight sensors (as discussed herein). Other embodiments may utilize any combination of various types of internal sensors. In the embodiment depicted in FIG. 5, cables 504 are utilized to provide data communications and/or power to the each of the plurality of internal sensors 502, although other embodiments may use a different number of cables and/or wireless connections for data and/or power. A support structure 506 is depicted in the embodiment of FIG. 5, although other embodiments may utilize a plurality of support structures or no support structure. In the embodiment depicted in FIG. 5, the support structure 506 is rigid, although one or more support structures may be flexible to change the orientation of one or more of the plurality of internal sensors 502 in some embodiments. In the embodiment depicted in FIG. 5, the cables 504 may be connected to a base portion 508 for data communications and/or power.

Figure 6:
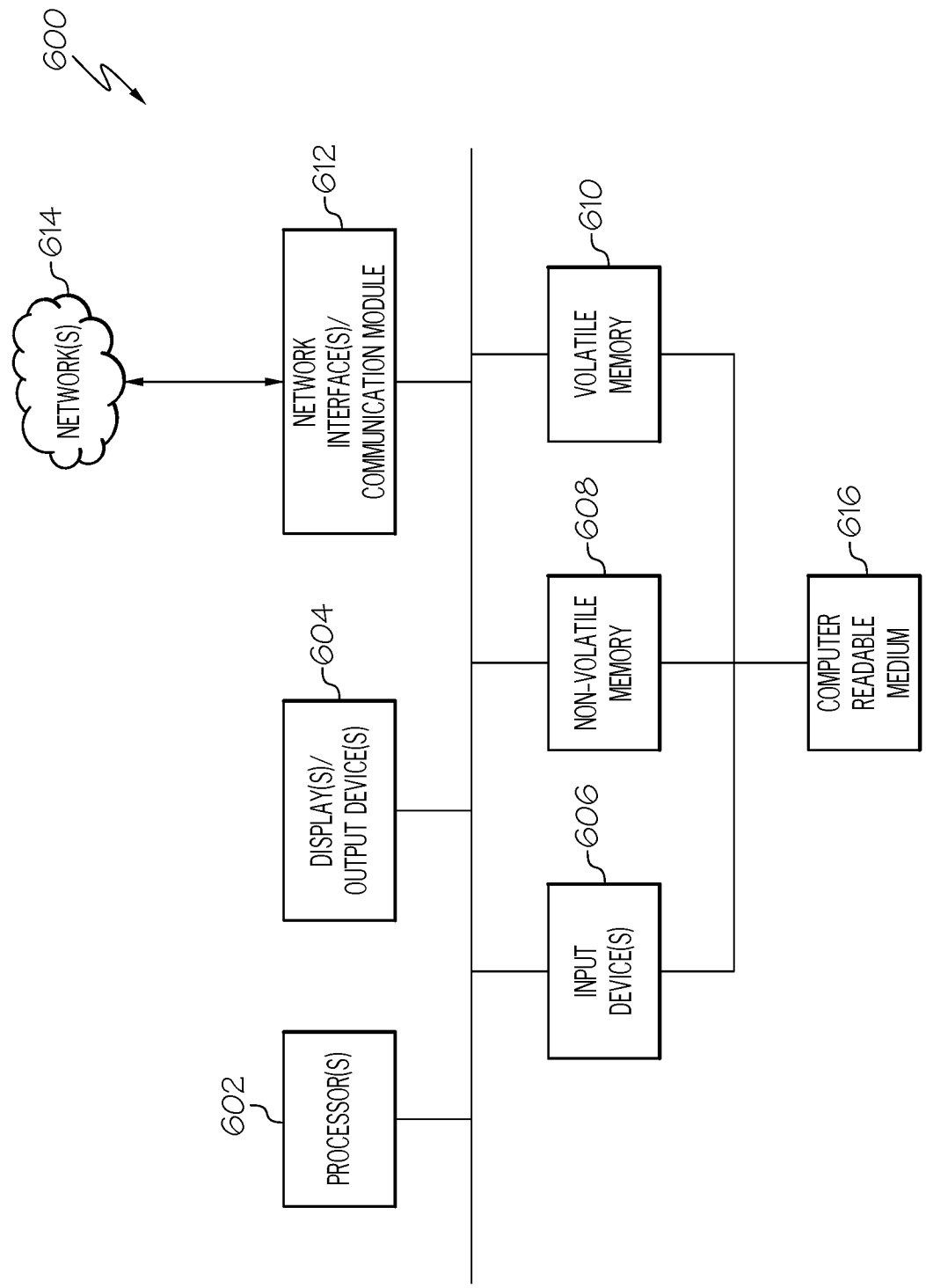
FIG. 6 depicts a block diagram of illustrative hardware utilized in one or more devices for detecting contact and geometry according one or more embodiments described and illustrated herein.

FIG. 6 depicts a block diagram depicting an illustrative computing device 600, through which embodiments of the disclosure can be implemented, such as (by way of non-limiting example) a deformable sensor 100 (FIG. 1), an internal sensor 130 (FIG. 1), a robot 200a, 200b (FIG. 4), or any other device described herein. Still referring to FIG. 6, the computing device 600 described herein is one example of a suitable computing device and does not suggest any limitation on the scope of any embodiments presented. Nothing illustrated or described with respect to the computing device 600 should be interpreted as being required or as creating any type of dependency with respect to any element or plurality of elements. In various embodiments, a computing device 600 may include, but is not limited to, a deformable sensor 100 (FIG. 1), an internal sensor 130 (FIG. 1), a robot 200a, 200b (FIG. 4), and/or the like. Still referring to FIG. 6, in an embodiment, the computing device 600 includes at least one processor 602 and memory (e.g., non-volatile memory 608 and/or volatile memory 610). The computing device 600 can include one or more displays and/or output devices 604 such as monitors, speakers, headphones, projectors, wearable-displays, holographic displays, and/or printers, for example. The computing device 600 may further include one or more input devices 606 which can include, by way of example, any type of mouse, keyboard, disk/media drive, memory stick/thumb-drive, memory card, pen, touch-input device, biometric scanner, voice/auditory input device, motion-detector, camera, scale, etc.

As noted above, the computing device 600 may include non-volatile memory 608 (ROM, flash memory, etc.), volatile memory 610 (RAM, etc.), or a combination thereof. A network interface 612 can facilitate communications over a network 614 via wires, via a wide area network (WAN), via a local area network (LAN), via a personal area network (PAN), via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. The network interface 612 can be communicatively coupled to any device capable of transmitting and/or receiving data via the network 614. Accordingly, the hardware of the network interface 612 can include a communication transceiver for sending and/or receiving any wired or wireless communication. For example, the network interface hardware may include an antenna, a modem, LAN port, Wi-Fi card, WiMax card, mobile communications hardware, near-field communication hardware, satellite communication hardware and/or any wired or wireless hardware for communicating with other networks and/or devices.

A computer readable storage medium 616 may include a plurality of computer readable mediums, each of which may be either a computer readable storage medium or a computer readable signal medium. A computer readable storage medium 616 may reside, for example, within an input device 606, within the non-volatile memory 608, within volatile memory 610, or any combination thereof. The computer readable storage medium 616 can include tangible media that is able to store instructions associated with, or used by, a device or system. The computer readable storage medium 616 includes, by way of non-limiting examples, RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. The computer readable storage medium 616 may also include, for example, a system or device that is of a magnetic, optical, semiconductor, or electronic type. Computer readable storage media and computer readable signal media are mutually exclusive. For example, the robots 200a, 200b depicted in FIG. 4 and/or a server may utilize a computer readable storage medium to store data received from one or more internal sensors 130 (FIG. 1) on each of the robots 200a, 200b.

Still referring to FIG. 6, the computer readable signal medium can include any type of computer readable medium that is not a computer readable storage medium and may include, for example, propagated signals taking any number of forms such as optical, electromagnetic, or a combination thereof. The computer readable signal medium may include propagated data signals containing computer readable code, for example, within a carrier wave. Computer readable storage media and computer readable signal media are mutually exclusive.

The computing device 600 may include one or more network interfaces 612 to facilitate communication with one or more remote devices, which may include, for example, client and/or server devices. In various embodiments, the computing device (for example, a robot or deformable sensor) may be configured to communicate over a network with a server or other network computing device to transmit and receive data from one or more deformable sensors 100 (FIG. 1) on one or more of the robots 200a, 200b. Still referring to FIG. 6, each of the one or more network interfaces 612 may also be described as a communications module, as these terms may be used interchangeably.

Figure 7:
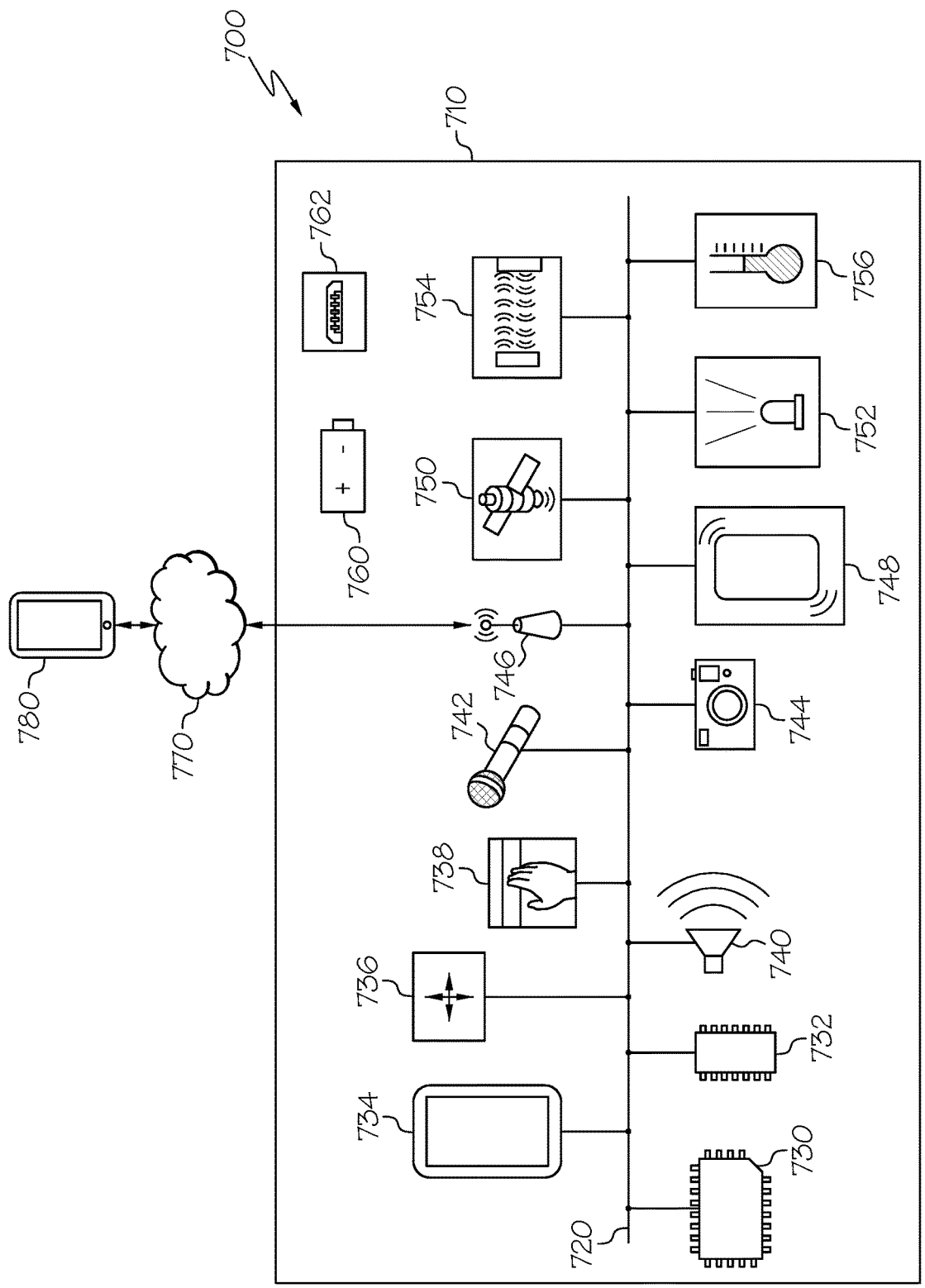
FIG. 7 depicts a block diagram illustrating hardware utilized in one or more robots for detecting contact and geometry according one or more embodiments described and illustrated herein.

Turning now to FIG. 7, illustrative components of one non-limiting embodiment of a robot 700 is schematically depicted. The robot 700 includes a housing 710, a communication path 720, a processor 730, a memory module 732, a tactile display 734, an inertial measurement unit 736, an input device 738, an audio output device 740 (e.g., a speaker), a microphone 742, an imaging device 744, network interface hardware 746, a tactile feedback device 748, a location sensor 750, a light 752, a proximity sensor 754, a temperature sensor 756, a battery 760, and a charging port 762. The components of the robot 700 other than the housing 710 may be contained within or mounted to the housing 710. The various components of the robot 700 and the interaction thereof will be described in detail below.

Still referring to FIG. 7, the communication path 720 may be formed from any medium that is capable of transmitting a signal such as, for example, conductive wires, conductive traces, optical waveguides, or the like. Moreover, the communication path 720 may be formed from a combination of mediums capable of transmitting signals. In one embodiment, the communication path 720 includes a combination of conductive traces, conductive wires, connectors, and buses that cooperate to permit the transmission of electrical data signals to components such as processors, memories, sensors, input devices, output devices, and communication devices. Accordingly, the communication path 720 may include a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 720 communicatively couples the various components of the robot 700. As used herein, the term "communicatively coupled" means that coupled components are capable of exchanging data signals with one another such as, for example, electrical signals via conductive medium, electromagnetic signals via air, optical signals via optical waveguides, and the like.

The processor 730 of the robot 700 may be any device capable of executing machine-readable instructions. Accordingly, the processor 730 may be a controller, an integrated circuit, a microchip, a computer, or any other computing device. The processor 730 may be communicatively coupled to the other components of the robot 700 by the communication path 720. This may, in various embodiments, allow the processor 730 to receive data from the one or more deformable sensors 100 (FIG. 1) which may be part of the robot 700. Still referring to FIG. 7, in other embodiments, the processor 730 may receive data directly from one or more internal sensors 130 (FIG. 1) which are part of one or more deformable sensors 100 (FIG. 1) on a robot 700. Accordingly, still referring to FIG. 7, the communication path 720 may communicatively couple any number of processors with one another, and allow the components coupled to the communication path 720 to operate in a distributed computing environment. Specifically, each of the components may operate as a node that may send and/or receive data. While the embodiment depicted in FIG. 7 includes a single processor 730, other embodiments may include more than one processor.

The memory module 732 of the robot 700 is coupled to the communication path 720 and is communicatively coupled to the processor 730. Referring to FIGS. 1 and 7, the memory module 732 may, for example, contain instructions to detect a shape of an object that has deformed the deformable membrane 120 of a deformable sensor 100. In this example, the instructions stored in the memory module 732, when executed by the processor 730, may allow for the determination of the shape of an object based on the observed deformation of the deformable membrane 120. The memory module 732 may include RAM, ROM, flash memories, hard drives, or any non-transitory memory device capable of storing machine-readable instructions such that the machine-readable instructions can be accessed and executed by the processor 730. The machine-readable instructions may include logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable instructions and stored in the memory module 732. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 7 includes a single memory module 732, other embodiments may include more than one memory module.

The tactile display 734, if provided, is coupled to the communication path 720 and is communicatively coupled to the processor 730. The tactile display 734 may be any device capable of providing tactile output in the form of refreshable tactile messages. A tactile message conveys information to a user by touch. For example, a tactile message may be in the form of a tactile writing system, such as Braille. A tactile message may also be in the form of any shape, such as the shape of an object detected in the environment. For example, the tactile display 734 may reproduce the shape of an object that is contacted by an end effector of the robot 700 such that a user touching the tactile display 734 "feels" the object while not actually touching the object. The tactile display 734 may provide information to the user regarding the operational state of the robot 700.

Any known or yet-to-be-developed tactile display may be used. In some embodiments, the tactile display 734 is a three dimensional tactile display including a surface, portions of which may raise to communicate information. The raised portions may be actuated mechanically in some embodiments (e.g., mechanically raised and lowered pins). The tactile display 734 may also be fluidly actuated, or it may be configured as an electrovibration tactile display.

The inertial measurement unit 736, if provided, is coupled to the communication path 720 and is communicatively coupled to the processor 730. The inertial measurement unit 736 may include one or more accelerometers and one or more gyroscopes. The inertial measurement unit 736 transforms sensed physical movement of the robot 700 into a signal indicative of an orientation, a rotation, a velocity, or an acceleration of the robot 700. The operation of the robot 700 may depend on an orientation of the robot 700 (e.g., whether the robot 700 is horizontal, tilted, and the like). Some embodiments of the robot 700 may not include the inertial measurement unit 736, such as embodiments that include an accelerometer but not a gyroscope, embodiments that include a gyroscope but not an accelerometer, or embodiments that include neither an accelerometer nor a gyroscope.

Still referring to FIG. 7, one or more input devices 738 are coupled to the communication path 720 and are communicatively coupled to the processor 730. The input device 738 may be any device capable of transforming user contact into a data signal that can be transmitted over the communication path 720 such as, for example, a button, a switch, a knob, a microphone or the like. In various embodiments, an input device 738 may be a deformable sensor 100 and/or an internal sensor 130 as described above (e.g., in FIG. 1). Still referring to FIG. 7, in some embodiments, the input device 738 includes a power button, a volume button, an activation button, a scroll button, or the like. The one or more input devices 738 may be provided so that the user may interact with the robot 700, such as to navigate menus, make selections, set preferences, and other functionality described herein. In some embodiments, the input device 738 includes a pressure sensor, a touch-sensitive region, a pressure strip, or the like. It should be understood that some embodiments may not include the input device 738. As described in more detail below, embodiments of the robot 700 may include multiple input devices disposed on any surface of the housing 710. In some embodiments, one or more of the input devices 738 are configured as a fingerprint sensor for unlocking the robot. For example, only a user with a registered fingerprint may unlock and use the robot 700.

The speaker 740 (i.e., an audio output device) is coupled to the communication path 720 and is communicatively coupled to the processor 730. The speaker 740 transforms audio message data from the processor 730 of the robot 700 into mechanical vibrations producing sound. For example, the speaker 740 may provide to the user navigational menu information, setting information, status information, information regarding the environment as detected by image data from the one or more imaging devices 744, and the like. However, it should be understood that, in other embodiments, the robot 700 may not include the speaker 740.

The microphone 742 is coupled to the communication path 720 and is communicatively coupled to the processor 730. The microphone 742 may be any device capable of transforming a mechanical vibration associated with sound into an electrical signal indicative of the sound. The microphone 742 may be used as an input device 738 to perform tasks, such as navigate menus, input settings and parameters, and any other tasks. It should be understood that some embodiments may not include the microphone 742.

Still referring to FIG. 7, the imaging device 744 is coupled to the communication path 720 and is communicatively coupled to the processor 730. The imaging device 744 may be any device having an array of sensing devices (e.g., pixels) capable of detecting radiation in an ultraviolet wavelength band, a visible light wavelength band, or an infrared wavelength band. The imaging device 744 may have any resolution. The imaging device 744 may be an omni-directional camera, or a panoramic camera. In some embodiments, one or more optical components, such as a mirror, fish-eye lens, or any other type of lens may be optically coupled to the imaging device 744. As described in more detail below, the imaging device 744 is a component of an imaging assembly operable to be raised above the housing 710 to capture image data.

The network interface hardware 746 is coupled to the communication path 720 and is communicatively coupled to the processor 730. The network interface hardware 746 may be any device capable of transmitting and/or receiving data via the network 770. Accordingly, the network interface hardware 746 can include a wireless communication module configured as a communication transceiver for sending and/or receiving any wired or wireless communication. For example, the network interface hardware 746 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 746 includes hardware configured to operate in accordance with the Bluetooth wireless communication protocol. In another embodiment, network interface hardware 746 may include a Bluetooth send/receive module for sending and receiving Bluetooth communications to/from an external electronic device 780. The network interface hardware 746 may also include a radio frequency identification ("RFID") reader configured to interrogate and read RFID tags.

In some embodiments, the robot 700 may be communicatively coupled to the external electronic device 780 via the network 770. In some embodiments, the network 770 is a personal area network that utilizes Bluetooth or a similar technology to communicatively couple the robot 700 and the external electronic device 780. In other embodiments, the network 770 may include one or more computer networks (e.g., a personal area network, a local area network, or a wide area network), cellular networks, satellite networks and/or a global positioning system and combinations thereof. Accordingly, the robot 700 can be communicatively coupled to the network 770 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

As stated above, the network 770 may be utilized to communicatively couple the robot 700 with the external electronic device 780. The external electronic device 780 may include a mobile phone, a smartphone, a personal digital assistant, a camera, a dedicated mobile media player, a mobile personal computer, a laptop computer, and/or any other portable electronic device capable of being communicatively coupled with the robot 700. The external electronic device 780 may include one or more processors and one or more memories. The one or more processors can execute logic to communicate with the robot 700. The external electronic device 780 may be configured with wired and/or wireless communication functionality for communicating with the robot 700. In some embodiments, the external electronic device 780 may perform one or more elements of the functionality described herein, such as in embodiments in which the functionality described herein is distributed between the robot 700 and the external electronic device 780.

The tactile feedback device 748 is coupled to the communication path 720 and communicatively coupled to the processor 730. The tactile feedback device 748 may be any device capable of providing tactile feedback to a user. The tactile feedback device 748 may include a vibration device (such as in embodiments in which tactile feedback is delivered through vibration), an air blowing device (such as in embodiments in which tactile feedback is delivered through a puff of air), or a pressure generating device (such as in embodiments in which the tactile feedback is delivered through generated pressure). It should be understood that some embodiments may not include the tactile feedback device 748.

The location sensor 750 is coupled to the communication path 720 and communicatively coupled to the processor 730. The location sensor 750 may be any device capable of generating an output indicative of a location. In some embodiments, the location sensor 750 includes a global positioning system (GPS) sensor, though embodiments are not limited thereto. Some embodiments may not include the location sensor 750, such as embodiments in which the robot 700 does not determine a location of the robot 700 or embodiments in which the location is determined in other ways (e.g., based on information received from the imaging device 744, the microphone 742, the network interface hardware 746, the proximity sensor 754, the inertial measurement unit 736, or the like). The location sensor 750 may also be configured as a wireless signal sensor capable of triangulating a location of the robot 700 and the user by way of wireless signals received from one or more wireless signal antennas.

Still referring to FIG. 7, the light 752 is coupled to the communication path 720 and communicatively coupled to the processor 730. The light 752 may be any device capable of outputting light, such as, but not limited to, a light emitting diode, an incandescent light, a fluorescent light, or the like. Some embodiments include a power indicator light that is illuminated when the robot 700 is powered on. Some embodiments include an activity indicator light that is illuminated when the robot 700 is active or processing data. Some embodiments include an illumination light for illuminating the environment in which the robot 700 is located. Some embodiments may not include the light 752.

The proximity sensor 754 is coupled to the communication path 720 and communicatively coupled to the processor 730. The proximity sensor 754 may be any device capable of outputting a proximity signal indicative of a proximity of the robot 700 to another object. In some embodiments, the proximity sensor 754 may include a laser scanner, a capacitive displacement sensor, a Doppler effect sensor, an eddy-current sensor, an ultrasonic sensor, a magnetic sensor, an internal sensor, a radar sensor, a LIDAR sensor, a sonar sensor, or the like. Some embodiments may not include the proximity sensor 754, such as embodiments in which the proximity of the robot 700 to an object is determine from inputs provided by other sensors (e.g., the imaging device 744, the speaker 740, etc.) or embodiments that do not determine a proximity of the robot 700 to an object.

The temperature sensor 756 is coupled to the communication path 720 and communicatively coupled to the processor 730. The temperature sensor 756 may be any device capable of outputting a temperature signal indicative of a temperature sensed by the temperature sensor 756. In some embodiments, the temperature sensor 756 may include a thermocouple, a resistive temperature device, an infrared sensor, a bimetallic device, a change of state sensor, a thermometer, a silicon diode sensor, or the like. Some embodiments of the robot 700 may not include the temperature sensor 756.

Still referring to FIG. 7, the robot 700 is powered by the battery 760, which is electrically coupled to the various electrical components of the robot 700. The battery 760 may be any device capable of storing electric energy for later use by the robot 700. In some embodiments, the battery 760 is a rechargeable battery, such as a lithium-ion battery or a nickel-cadmium battery. In embodiments in which the battery 760 is a rechargeable battery, the robot 700 may include the charging port 762, which may be used to charge the battery 760. Some embodiments may not include the battery 760, such as embodiments in which the robot 700 is powered the electrical grid, by solar energy, or by energy harvested from the environment. Some embodiments may not include the charging port 762, such as embodiments in which the apparatus utilizes disposable batteries for power.

Figure 8:
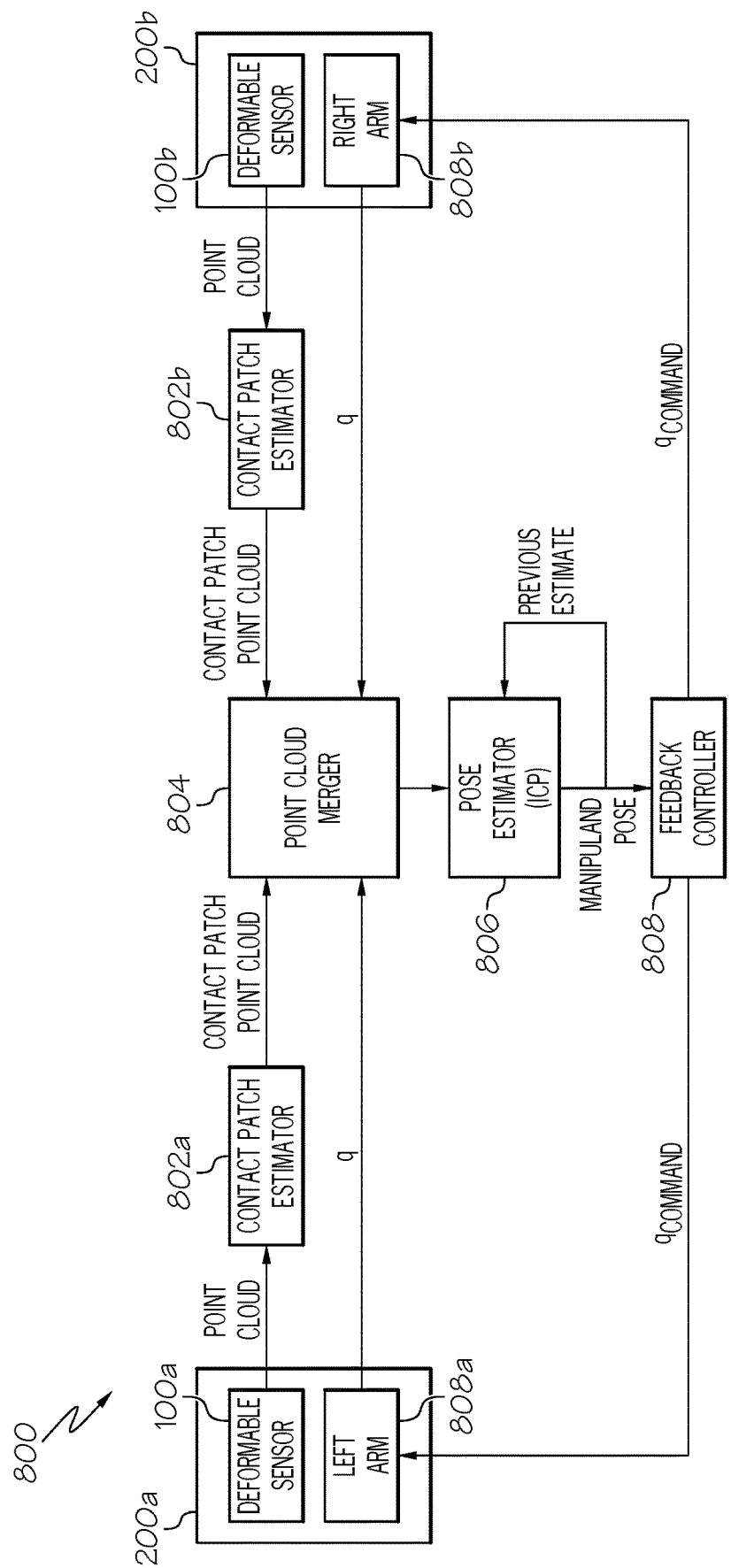
FIG. 8 depicts a flow diagram of an illustrative overview method of determining contact and geometry, estimating pose, and providing feedback according to one or more embodiments shown and described herein.

FIG. 8 depicts a block diagram 800 of an operation of the robots 200a, 200b depicted in FIG. 4 including point cloud contact patch estimation, object pose estimation motion planning, and execution. As will be described in greater detail hereinbelow, each of the deformable sensors 100a, 100b may provide point cloud information, which is used by contact patch estimators 802a, 802b to generate contact patch point clouds and are merged at block 804. From the merging of point clouds, a pose estimator 806 estimates a pose of a target object (e.g., a manipuland), which is transmitted to a feedback controller 808 to provide feedback to the robots 200a, 200b (including, for example, left arms 808a, 808b thereof) such that the robots 200a, 200b can move accordingly to manipulate the target object.

Sensor Model: Membranes as an Assembly of Flat Elements

Referring generally to FIGS. 1-8, an approach to determining a shape, size, and/or relative orientation of the object 215 to at least one of the robots 200a, 200b is described. The deformable membrane 120 of the deformable sensor 100 is modeled as an assembly of flat membrane elements. The deformable membrane 120 is an approximation in the limit to zero thickness that does not support in-plane compression or out-of-plane bending or shear.

The model described herein includes a linear approximation to the deformation of the deformable membrane 120 from an initial surface shape $\mathcal{S}_0$ initially pressurized at an absolute pressure $P_0$, which is referred to herein as the reference configuration. The kinematics of the deformable membrane 12 is approximated such that each material point $x_0$ in the reference configuration $\mathcal{S}_0$ deforms into a point x in the current configuration S according to Equation (1) below:

$$x = x_0 + u(x_0)\hat{n}_0(x_0) \qquad (1)$$

where $\hat{n}_0(x_0)$ is the outward normal to the surface in the reference configuration and $u(x_0)$ is a scalar field describing displacements in the normal direction only. The approximation in terms of a single scalar field $u(x_0)$ is justified by the observation that, when pressurized, the deformable membrane 120 of the deformable sensor 100 does not wrinkle or fold onto itself unless extreme contact loads are applied.

To further simplify the model, a homogeneous and isotropic in-plane stress is assumed, similar to the surface tension at the interface between two fluids. The surface tension at the reference configuration is then characterized by a single scalar $\gamma_0$, which must be determined as part of a system identification process as a function of $P_0$. For this particular state of stresses, the out-of-plane balance of momentum reduces to $$2H\gamma_0 + P = 0 \text{ in } \mathcal{S} \tag{2}$$

with H being the mean curvature and P the applied absolute pressure, which is the Young-Laplace equation.

The reference surface $\mathcal{S}_0$ is discretized with a mesh of triangle elements $\Delta_0^e$ defined by the nodal points $x_{0,i}$ of the mesh. The deformation of the surface is then described in a Lagrangian manner by the motion of the mesh nodal points $x_{0,i}$ in the reference surface $\mathcal{S}_0$ to nodal positions $x_i$ in the current surface configuration $\mathcal{S}$. In the notation above, i indexes the nodes of the mesh. Similarly, e indexes all triangle elements of the mesh.

For small displacements from the reference configuration, the mean curvature of a flat membrane element can be approximated as $2H = \nabla^2 u$, with the Laplace operator $\nabla^2(\cdot)$ taken in a local two-dimensional frame for the flat triangle element. Thus the momentum balance in Equation (2) reduces to $$\gamma_0 \nabla^2 u + p = 0 \text{ in } \Delta_0^e \tag{3}$$

In Equation (3), $u(x)$ represents small displacements from the reference configuration and pressure $p(x)$ represents deviations from the reference pressure $P_0$. That is, the absolute pressure is given by $P = P_0 + p$.

Discretization of Equation (3) in a local element frame $T^e$ by a standard Finite Element Method (FEM) leads to the local stiffness matrix $k_{a,b}^e$, where indexes a, b refer to local nodal points in element e. The global stiffness matrix of the system K is then obtained from each element stiffness matrix $k_{a,b}^e$ using a standard assembly procedure. The pressure term in Equation (3) is lumped to obtain a diagonal matrix multiplying the vector of pressure unknowns. The final discrete equation reads $$Ku = \text{diag}(A)p, \tag{4}$$

where u is the vector of displacements, p is the vector of normal stresses, A is a vector that at the i-th node in the mesh and diag(v) denotes the operator that forms a diagonal matrix with the elements of v. With n the number of nodes in the mesh, u, p, and A are vectors $\mathbb{R}^n$. The stiffness matrix $K \in \mathbb{R}^{n \times n}$ is symmetric and positive definite.

A. Internal Pressure

The normal loads in Equation (4) are split into a single scalar pressure $p_v$ internal to the deformable sensor 100 and a contact pressure at each point $p_c$ external to the deformable sensor 100 as $$Ku = -\text{diag}(A)p_c + Ap_v, \tag{5}$$

where $p_v$ and $p_c$ denote deviations from a nominal value and are zero in the reference configuration. Positive values of $p_v$ correspond to an increase in the internal absolute pressure of the deformable sensor 100 while positive values of $p_c$ correspond to external forces pushing on the deformable sensor 100. Since contact with an external object can only push into the deformable membrane 120, $p_c$ must be positive for all points. Note that $p_v$ is a single scalar while $p_c$ is a vector containing the contact pressure at each nodal point.

The total absolute pressure inside the deformable sensor 100 is given by $P = P_0 + p_v$ and relates to the volume of air V within the deformable sensor 100 by the ideal gas law as $$P(V) = P_0 \frac{V_0}{V}, \tag{6}$$

where $V_0$ is the volume of the deformable sensor 100 in the reference configuration. An expression for the volume in terms of displacements u follows from Gauss's theorem as the surface integral $$V = \frac{1}{3} \int_S x \cdot \hat{n}(x) d^2 x, \tag{7}$$

The integral in Equation (7) is computed using the parametric expression for x as described herein while the normal $\hat{n}$ in the current configuration is approximated by the normal $\hat{n}_0$ to in the reference configuration. To obtain a linear expression of V with the displacements, Equation (7) is approximated as $$V \approx \frac{1}{3} \int_S x \cdot \hat{n}_0(x_0) d^2 x_0, \tag{8}$$

Using the parametric representation for x in Equation (1) leads to the expression for the volume as $$V(u) = V_0 + \frac{1}{3} A^T u, \tag{9}$$

B. Contact Constraints

Figure 9:
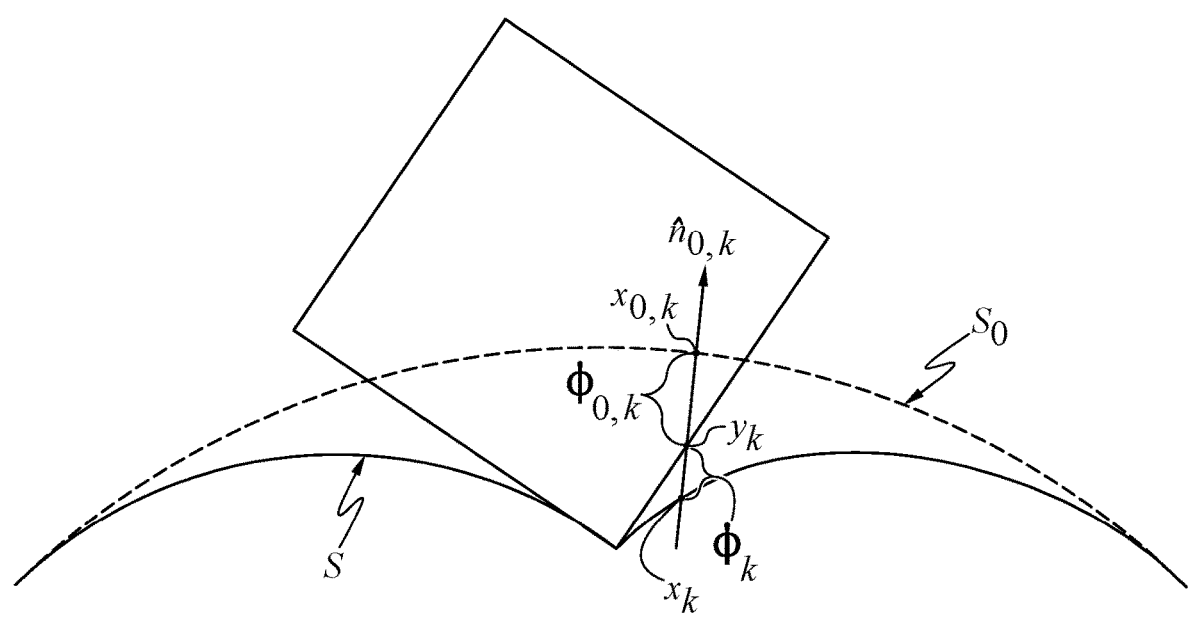
FIG. 9 schematically depicts kinematics of an object causing deformation of a deformable sensor according to one or more embodiments shown and described herein.

Contact constraints between the membrane of the deformable sensor 100 and the external object are necessary for simulation purposes. Consider an external rigid object located in a position that interferes with the location of the membrane in its reference configuration, as shown in FIG. 9. A point $X_{0,k}$ that in the reference configuration is located inside the object must necessarily move in order to avoid an impossible interpenetration. Since Equation (1) establishes that points can only move in the normal direction, a potential contact point $y_k$ on the object corresponding to $X_{0,k}$ is determined by casting a ray from $X_{0,k}$ in the direction opposite to the normal of the deformable membrane 120. The signed distance between point $y_k$ and point $x_k$ in the current configuration can be computed as $$\phi_k = (y_k - x_k) \cdot \hat{n}_{0,k}, \tag{10}$$

which after substituting $x_k$ in Equation (1) can be written as $$\phi_k = (y_k - x_{0,k} - u_k \hat{n}_{0,k}) \cdot \hat{n}_{0,k} = \phi_{0,k} - u_k, \tag{11}$$

where $\phi_{0,k}$ denotes the signed distance between $y_k$ and $x_{0,k}$, a negative quantity indicating interpenetration. The set of all signed distances is placed within a single vector $\phi$ of size $n_c$, the number of contact candidates. Equation (11) is written in vector form as $$\phi = \phi_0 + Hu, \tag{12}$$

with $\phi$ and $\phi_0$ in $\mathbb{R}^{n_c}$ and H, a sparse matrix in $\mathbb{R}^{n_c \times n}$ with $H_{k,i} = -1$ for the k-th contact corresponding to the ray cast from the i-th point $x_{0,i}$ in the reference mesh. All other entries in H are zero.

The contact constraints are a statement of the Signorini boundary condition. At each point on the deformable membrane 120, either the signed distance is zero and there is a positive contact pressure acting at that point or the signed distance is positive and the contact pressure at that point is zero since there is no contact. This condition is formally written as the complementarity condition $$0 < \phi \perp p_c > 0 \quad (13)$$

or, in terms of displacements, $$0 < \phi_0 + Hu \perp p_c > 0 \quad (14)$$

C. Simulation

Given an external object and its relative pose in the frame of the sensor, the vector 400 containing the set of signed distances for candidate contact points can be computed as described herein. With the set of candidate contact points identified, both 400 and H as defined in Section B above are available as a function of the pose of object relative to the deformable sensor 100.

Notice that, given a mesh discretizing the reference configuration $\mathcal{S}_0$, the stiffness matrix K and the vector of nodal areas A are fixed. That is, these quantities can be computed in a pre-processing step.

Given that the non-linear relationship between deformations and the internal pressure of the deformable sensor 100 given by Equations (6) and (9), a fixed-point iteration on the internal pressure $p_v$ is used. Given the pressure $p_v^m$ at the m-th iteration, the following at the m-th iteration, the following MLCP is solved for the unknowns $u^m$ and $p_c^m$ $$Ku^m + \text{diag}(A)p_c^m = Ap_v^m,$$

$$\text{s.t. } 0 < \phi_0 + Hu^m \perp p_c^m > 0. \quad (15)$$

An efficient way to solve the problem stated in Equation (15) is writing the equivalent QP as $$u^{m+1} = \underset{u}{\text{argmin}} \; \frac{1}{2} u^T K u - p_v^{m T} A^T u, \quad (16)$$

$$\text{s.t.} \quad 0 < \phi_0 + Hu.$$

Notice that the matrices K and H in the QP stated in Equation (16) are sparse and therefore a QP solver that exploits sparsity is used.

Once $u^{m+1}$ is solved from Equation (16), the enclosed air volume is updated with Equation (9) and the internal pressure is updated according to the ideal gas law in Equation (6). This provides the value of $p_v^{m+1} = P^{m+1} - P_0$ for the next iteration and Equation (16) is solved again with the updated value of pressure. Relaxation is used on the pressure $p_v$ to attain convergence. A relaxation factor $\omega = 0.6$ may be used in some embodiments. Convergence is monitored on the relative change of $p_v$ between iterations.

Figure 10:
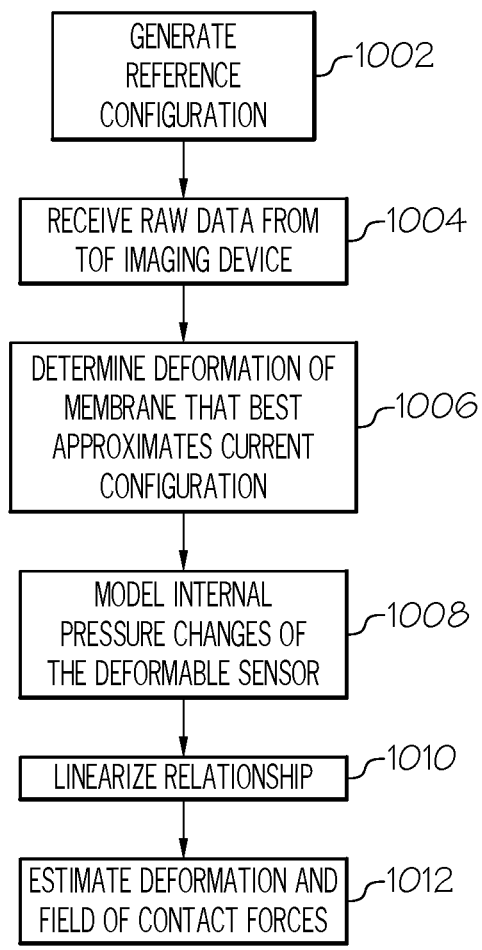
FIG. 10 depicts a flow diagram of an illustrative method of estimating a shape and a pose of a manipuland according to one or more embodiments shown and described herein.
Figure 11A:
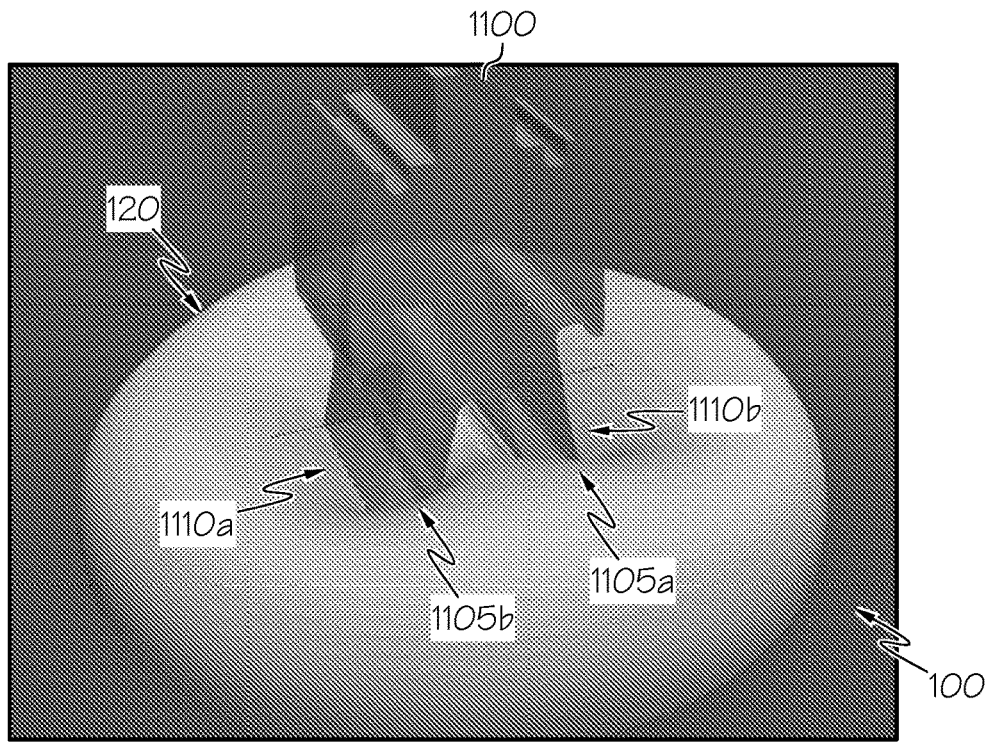
FIG. 11A schematically depicts an object contacting a deformable sensor such that the deformable sensor deforms according to one or more embodiments shown and described herein.
Figure 11B:
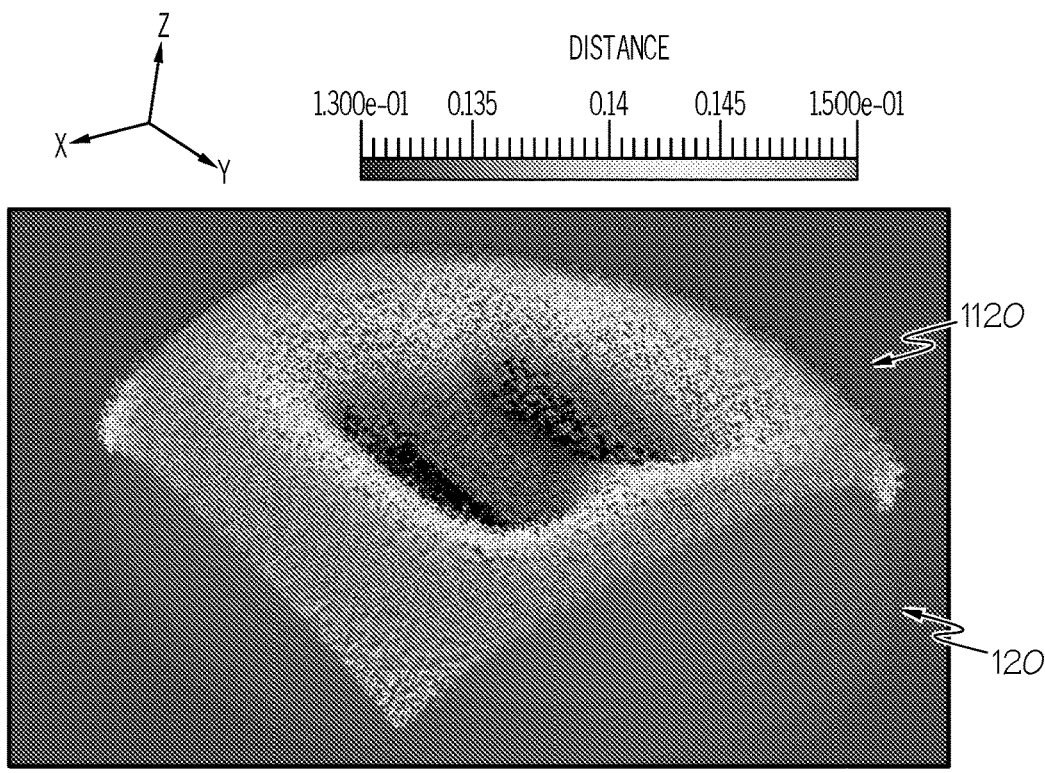
FIG. 11B schematically depicts an illustrative point cloud of a determined shape of the deformable sensor upon contact with the object of FIG. 11A superimposed over an image of the deformable sensor according to one or more embodiments shown and described herein.

FIG. 10 depicts a flow diagram of an illustrative method of estimating a shape and a pose of a manipuland, and FIGS. 11A and 11B depict the simulation results for an illustrative manipuland (e.g., a rigid robot toy 1100) contacting the deformable sensor 100. Referring particularly to FIG. 11A, the simulation resolves two separate indentations 1105a, 1105b on the deformable membrane 120 caused by each leg 1110a, 1110b of the rigid robot toy 1100 on the deformable membrane 120. As depicted in FIG. 11A, the deformable membrane 120 bulges between the legs 1110a, 1110b of the rigid robot toy 1100 caused by an increase of air pressure inside the deformable sensor 100. FIG. 11B depicts a simulation of a point cloud 1120 for this configuration that is coded according to distance to the time-of-flight sensor (not shown) with the deformable membrane 120 depicted below the point cloud 1120 for reference. The point cloud 1120 is simulated by ray casting from the center of the imaging device (not shown), in the direction of the ray $\hat{r}_r$ for each pixel, and computing the distance from the center of the imaging device to the point on the deformable membrane 120 hit by the casted ray. Gaussian noise is added to each distance in accordance with the noise levels reported by the manufacturer of the time-of-flight sensor. Additional information regarding the simulation of the camera sensor is described in greater detail hereinbelow.

Inverse Problem and Contact Patch Determination

Still referring to FIGS. 10, 11A, and 11B, the inverse problem is to transform the raw data from the deformable sensor 100, here a point cloud measured by an internal time-of-flight imaging device (as described herein), into the points corresponding to the actual contact with the object. This is nontrivial because the actual surface deformation extends to regions far out from the contact patch. This problem is aggravated as the external object (e.g., the rigid robot toy 1100 depicted in FIG. 11A) pushes deeper into the deformable sensor 100 causing larger deformations (e.g., the indentations 1105a, 1105b depicted in FIG. 11A). Previous attempts to use a number of ad-hoc strategies to identify the contact patch failed to produce promising results. One of these strategies consisted of finding a best mesh fit to the point cloud data by least squares and subsequently computing surface curvatures in an attempt to identify regions on the surface with large bending due to contact with an external object. This strategy offered unsatisfactory results because a) noise in the point cloud data significantly affects the quality of the computed curvatures; b) the least square procedure introduces a regularization parameter that must be tuned in and ad-hoc manner; and c) curvature alone is not a good measure to identify contact as exemplified in FIG. 11A, which shows high curvature between the legs 1110a, 1110b of the rigid robot toy 1100, even though there is no contact in that region.

The present disclosure uses an inverse problem strategy that finds the external contact forces producing a deformation of the deformable sensor 100 that best matches the point cloud data. The overall strategy is stated as a QP that minimizes the error between the distances measured by the real imaging device with those estimated by the model, while satisfying the laws of physics as linear constraints. In practice, this strategy is shown to produce results with low levels of noise when compared to pure ad-hoc least square strategies, providing not only cleaner geometric measures but also a direct prediction of regions on which forces are applied.

A. Modeling Point Cloud Distances

Referring to FIG. 10, the reference configuration is generated at block 1002, as described herein. As previously noted herein, the reference configuration generally corresponds to an initial shape of the deformable membrane prior to contact with the manipuland. In addition, raw data is received from the time-of-flight imaging device at block 1004. The raw data includes points in space that are measured by the time-of-flight imaging devices and indicating a current state of deformation of the membrane due to contact with the manipuland. For example, as shown in FIG. 11A, the deformable membrane 120 is deformed due to pressure applied by each leg 1110a, 1110b of the rigid robot toy 1100 on the deformable membrane 120, which is indicated by the point cloud 1120 received from the time-of-flight imaging device. Referring again to FIG. 10, at block 1006, a deformation of the deformable membrane that best approximates a current configuration is determined. Such a determination is completed in a least squares sense while satisfying a discrete physical model enforced as a linear constraint that corresponds to a linearized physical model of the deformation of the deformable membrane that is discretized with a Finite Element Method (FEM). At block 1008, the internal pressure changes of the deformable sensor that occur due to contact between the manipuland and the deformable membrane are modeled. Such modeling is completed using an ideal gas law that imposes a relationship between the internal pressure and a volume of the deformable sensor. That is, the r-th point measured by the sensor (e.g., a time-of-flight sensor) is modeled as the point $x_r$ on the surface of the sensor in the current configuration that results from emitting a ray with direction $\hat{r}_r$ from the center of the camera c towards the deformable membrane 120. The ray direction $\hat{r}_r$ is a known fixed quantity for each pixel of the imaging device and can be found from the specifications of the particular imaging device model (e.g., a particular camera model).

Equation (1) hereinabove states that given a point $x_r$ in the current configuration, there exist a point $x_{0,r}$ in the reference configuration such that $$x_r = x_{0,r} + u_r \hat{n}_{0,r}, \quad (17)$$

where $u_r$ is the local displacement and $\hat{n}_{0,r}$ is the normal vector in the reference configuration. Since the precise locations of both $x_r$ and $x_{0,r}$ depend on the current state of deformations, the relationship expressed in Equation (17) is non-linear in the displacements vector u. At block 1010, the relationship is linearized to obtain a linearized pressure-volume relationship. To linearize Equation (17), $x_{0,r}$ is approximated as a point found by ray-casting from the imaging device into the reference configuration. Therefore $x_{0,r}$ is computed once as a pre-processing step at the beginning of the computation together with the normal $\hat{n}_{0,r}$ and the FEM shape function vector $S_r$ such that the displacement at $x_{0,r}$ can be interpolated with $u_r = S_r^T u$.

The distance from the imaging device center (e.g., camera center) c to point $x_r$ is given by $$d_r = \hat{r}_r \cdot (x_r - c). \quad (18)$$

Using Equation (17) and the pre-computed local interpolation $u_r = S_r^T u$ for the displacement, the distance is written as $$d_r = d_{0,r} + (\hat{r}_r \cdot \hat{n}_{0,r}) S_r^T u, \quad (19)$$

where $d_{0,r} = \hat{r}_r \cdot (x_{0,r} - c)$ is the distance in the reference configuration $S_0$. This equation is cast in vector form as $$d = d_0 + Du, \quad (20)$$

with do the vector of distances in the reference configuration, d the vector of distances in the current configuration and matrix D containing at each r-th row the row vector $(\hat{r}_r \cdot \hat{n}_{0,r}) S_r^T$.

B. Inverse Problem Cost Function

The inverse problem is formulated so that the error $f = \|d - \tilde{d}\|^2$ between the measured distances $\tilde{d}$ and the modeled distances d is minimized. This cost is stated in terms of displacements using Equation (20)

$$g(u) = \frac{1}{2} u^T Q u + f^T u, \quad (21)$$

where $Q = 2D^T D$, $f = 2D^T d_0$. It should be understood that that an additional term $\|d_0\|^2$ is omitted from Equation (21) since it is constant and would have no effect on the minimization process.

C. Linearization of the Ideal Gas Law

The inverse problem formulation can be cast as an efficient-to-solve QP if the ideal gas law constraint imposed by Equation (6) is linearized. This linearization, together with Equation (9) to write volume changes in terms of the displacements, leads to the following linear constraint $$p_v = -\frac{P_0}{3V_0} A^T u. \quad (21)$$

D. Inverse Problem and Contact Patch Estimation

At block 1012, the deformation and the field of contact forces are estimated. This is completed by solving a least squares formulation with the linearized physical constraints of the linearized pressure-volume relationship cast as a sparse quadratic program. Referring also to FIGS. 11A and 11B, the resulting inverse problem is formulated as the QP:

$$\begin{aligned} &\operatorname{argmin} \frac{1}{2} u^T Q u + f^T u, \quad (21)\\ &x = [u, p_c, p_v]\\ &\text{s.t.} \quad Ku + \operatorname{diag}(A) p_c = A p_v,\\ &\qquad \frac{P_0}{3V_0} A^T u + p_v = 0,\\ &\qquad p_c \geq 0. \end{aligned}$$

It should be understood that this formulation finds an optimum solution in both u and $p_c$ as well as in the internal pressure changes $p_v$. Therefore, the strategy has no knowledge of the geometry of the external object making contact with the deformable membrane 120 of the deformable sensor 100. Once the solution is found, the contact patch is identified as those points of the mesh (e.g., the point cloud 1120) that have a non-zero contact pressure. However, with real data containing noise, the computed contact pressure exhibits spurious non-zero values at regions away from the contact patch. These values are significantly lower than those within the contact region and simple thresholding can be used to identify the contact patch.

E. Performance Against Synthetic Data

Figure 12A:
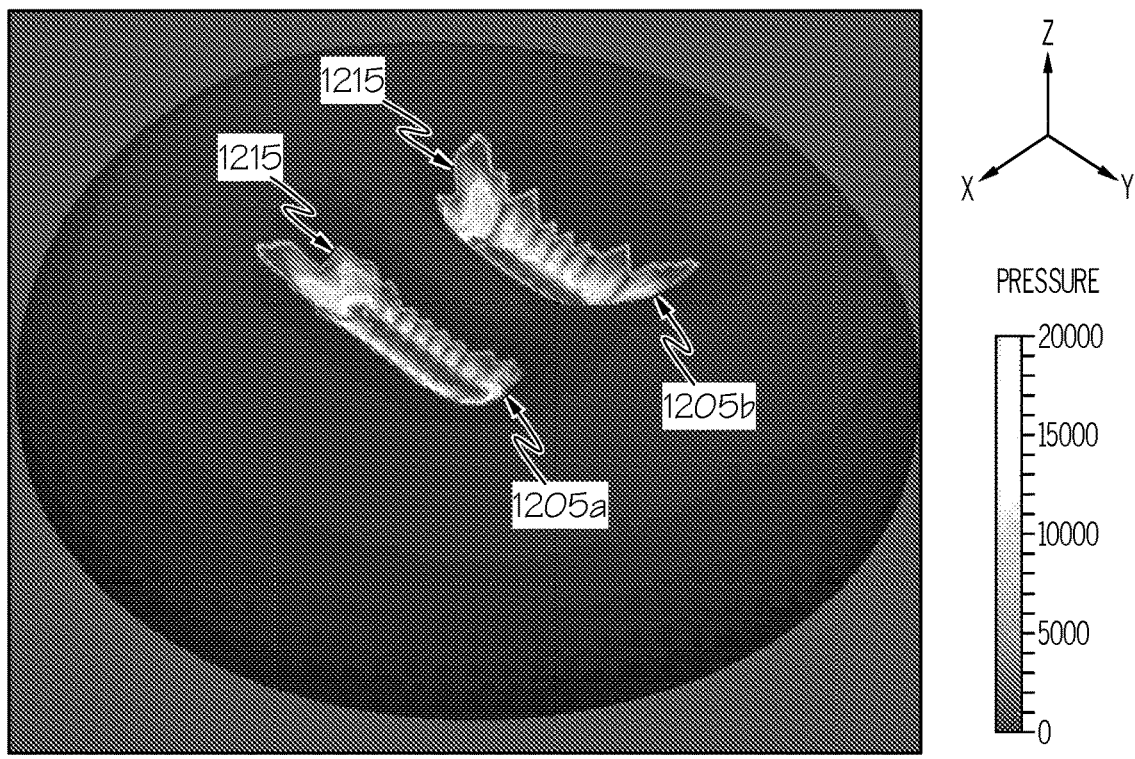
FIG. 12A schematically depicts an illustrative 3D model indicating an amount of pressure caused at one or more points of the deformable sensor by the object of FIG. 11A according to one or more embodiments shown and described herein.
Figure 12B:
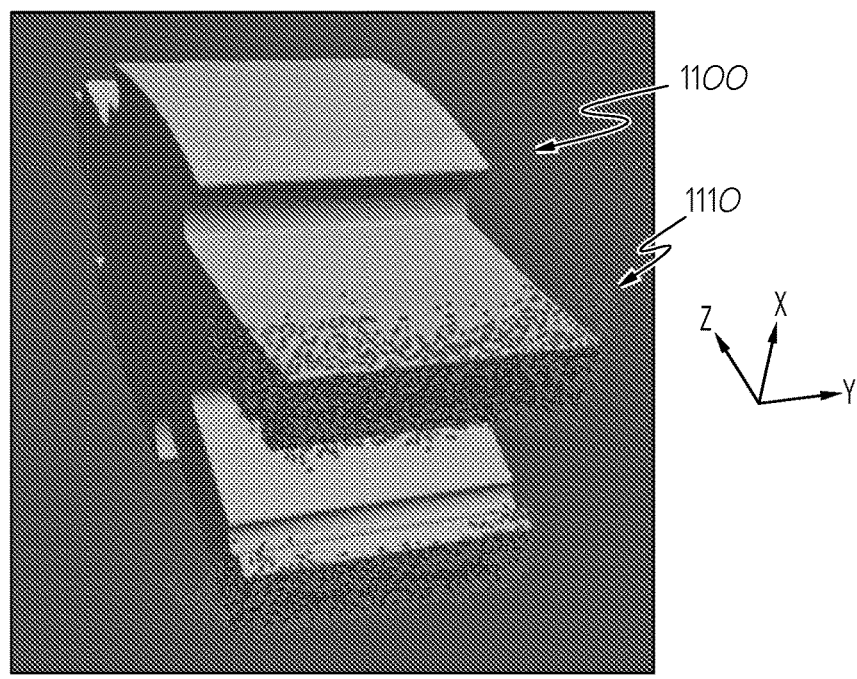
FIG. 12B schematically depicts an illustrative generated point cloud corresponding to an estimated shape and pose of the object of FIG. 12A superimposed over the object according to one or more embodiments shown and described herein.

The performance of the inverse method described herein tested against synthetic point cloud data generated for the simulation presented herein is depicted in FIGS. 11A and 11B. FIGS. 12A and 12B depict the result from the contact patch detection strategy summarized in Equation (23) for a given pose of the robot toy object 1100 (FIG. 11A). Estimated deformations 1205a, 1205b are shown in FIG. 12A, scaled by the estimated contact pressure. The low level of noise in the estimated deformations 1205a, 1205b is present, even though the point cloud data contains noise. The computed contact pressure is interpolated onto each point of the cloud and thresholding is used to identify a subset 1110 that best corresponds to the contact patch. This subset 1110 is depicted in FIG. 12B together with the original robot toy 1100. It should be understood that the methodology proposed is able to filter out the region between the legs of the robot toy 1100 even in the presence of high gradients and curvatures. FIG. 12A depicts the contour lines 1215 corresponding to the threshold level used to discriminate the contact patch. A threshold level may be selected as a factor of the average contact pressure $A^T p_c/\|A\|_1$.

Experimental Examples

In this section, various experiments validating the contact-patch model and demonstrating its efficacy in manipulation tasks is presented.

A. Sensor and Robot Setup

Soft-bubble sensors including an elastic membrane sensing surface, an airtight hull that allows pressurization of the membrane, and an internal ToF based depth sensor (a PMD pico flexx) were used. Once inflated, the membrane forms a deformable spherical cap (the soft-bubble) about 20 mm to about 75 mm in height. For the analysis and results presented herein, the soft bubble was inflated it to about 50 mm in height with an internal pressure of about 0.375 psi. The complete sensor assembly weighed about 500 grams and was mounted as the end-effector for each of two KMR iiwa arms (Kuka Robotics Corporation, Shelby Twp, MI). The internal depth sensor demonstrates a distinctive distortion at the depths measured within the bubble sensor (about 12 cm to about 17 cm) which was characterized using a simple linear fit per pixel and then rectified. The camera was set to use fixed exposure and the driver was configured to stream data at about 15 Hz.

The interface software for modelling and control was written in a combination of Python and C++ and utilized components of the Drake toolbox (Robot Locomotion Group, Massachusetts Institute of Technology, Cambridge, MA) for control and the point cloud library (PCL) available at pointclouds.org for the point-cloud processing. The membrane model and the contact patch estimator were implemented in Matlab (The MathWorks, Inc., Natick, MA).

B. Soft-bubble System Identification

System identification for the soft-bubble includes fitting a single term, $\gamma_0$ from Equation (2), since the reference pressure $P_0$ is fixed a priori (about 0:375 psi) from depth measurements of an undeformed inflated membrane. The assumption that the bubble geometry matches a hemisphere is used and thus $\gamma_0$ can be obtained from the analytic form of the Young-Laplace equation. To validate the system identification, predicted and sensed point clouds from contact are compared with a known object at a known pose. This was performed by using a KMR iiwa arm (Kuka Robotics Corporation, Shelby Twp, MI) to press the soft-bubble onto a pyramidal frustum mounted at a known pose. The pose of the time-of-flight (ToF) depth sensor inside the soft-bubble relative to the wrist of the robot is known from the CAD model of the airtight hull and ToF sensor mount. Data capture and analysis for validation takes only a few minutes and is representative of the ease-of-use of the model-based method described herein when compared to the data-driven techniques based on machine learning that are becoming increasingly common in soft robotics. System identification is only dependent on reference pressure, sensor geometry (bubble diameter) and membrane material (latex). Thus, the identified constants are identical for all additional sensors of the same form factor, making it an extremely efficient and easy to deploy procedure.

C. Contact-Patch Estimation

The contact-patch estimation algorithm presented herein was implemented in Matlab (The MathWorks, Inc., Natick, MA) and used the quadprog routine to solve Equation (23). Contact patch estimation was run asynchronously and computation time was measured at between about 7 Hz to about 10 Hz including overhead for point cloud data serialization/deserialization when run on an average dual-core laptop. The contact patch estimator produces a contact pressure map $p_c$ corresponding to each point on the measured point cloud. In practice, for the chosen depth sensor and its settings, this results in about 37000 points being processed for every frame captured. From the contact pressure map, the estimated contact patch was identified by a simple thresholding operation to eliminate spurious numerical results, where the threshold was set to $\kappa A^T p_c/\|A\|_1$. A scaling factor of $\kappa=1$ is sufficient in most cases. The computed contact patch was then published as a point cloud to be consumed by the next stage of a perception pipeline.

D. Pose Estimation

As a proof-of-concept use of the contact patch estimator described herein within a conventional robot perception pipeline, the contact patch estimator was combined with an ICP-based pose estimator. The computed contact patch was used as the measurement cloud to align the template of a known reference object using the ICP implementation from PCL. The solution with the lowest ICP fit score was further refined with a secondary ICP alignment against the rectified point cloud from the bubble sensor from points in the vicinity of contact patch. The complete pose estimation pipeline runs at about 2 Hz to about 5 Hz.

E. Dual Arm Object Manipulation

The soft-bubble naturally lends itself to use as a compliant fingertip for manipulation tasks. Accordingly, two soft-bubble sensors were mounted, respectively, on dual KMR iiwa robot arms (Kuka Robotics Corporation, Shelby Twp, MI), as shown in FIG. 13, as an analog to a pair of fingers. An open-loop manipulation task was performed in which the two arms screw a nut onto a bolt and used the soft-bubble sensors to track the resulting contact patches. For the nut-turning task, arm joint configurations for turning the nut are computed using constrained optimization-based inverse kinematics and regrasp motions are generated using a bi-directional RRT planner. The resulting contact patches from the contact manipulation were computed at a rate of about 7 Hz to about 10 Hz. FIG. 13 shows a sequence of poses from the task with the corresponding sensed point clouds and estimated contact patches. The contact patch is accurately estimated and the highly deformable membrane of the sensor provides a secure grasp on the nut. While the nut-turning task is performed open-loop, the soft-bubble sensors described herein provide feedback that could be used to accurately track the grasp on the nut and detect any unwanted slip.

It should now be understood that the systems and methods described herein provide a model for the behavior of a deformable membrane in a deformable sensor. A forward model predicts deformation given the pose and geometry of a contacting rigid object, and a converse inverse model estimates a contact patch between the flexible sensor and arbitrary objects. The inverse model, formulated as a sparse QP, can be efficiently computed and estimates contact patches with sufficient accuracy. Used together with an ICP-based pose estimator, the pose of objects contacting the flexible sensor can be accurately tracked. Such a tracking enables methods for robotic manipulation on a contact-rich manipulation task with a dual-arm robot system using the deformable sensors as end-effectors to screw an oversized nut onto a bolt.

Feedback through contact is vital for performing robust manipulation. It can be used at short timescales as feedback to a stabilizing controller and at large timescales to monitor contact mode or type. A policy-based planning and execution approach exploits contact and robot compliance to perform manipulation tasks in the presence of uncertainty. For each action performed, the outcome of each action must be identified. For motions in contact, comparison between expected contacts from planning and observed contacts from the deformable sensor through the contact-patch estimator described herein is an ideal means for identifying the outcomes of actions and determining which action to perform next.

The systems and methods described herein are noteworthy for the speed at which an estimation can be computed and the ease of system identification. The model described herein can be computed at about 5 Hz to about 10 Hz on an average dual-core laptop. The relatively straightforward nature of the model formulation means that it only requires simple and straightforward system identification—a process that can be completed in a matter of minutes and used for other deformable sensors of the same materials and form-factor.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of estimating deformation and a field of contact forces causing deformation of at least one deformable sensor comprising a deformable membrane and a time-of-flight imaging device with a field of contact forces caused by a manipuland held by a robot comprising the at least one deformable sensor, the method comprising:
generating, by a processing device, a reference configuration comprising a plurality of reference points in space, the reference configuration corresponding to an initial shape of the deformable membrane prior to contact with the manipuland;
receiving, by the processing device, raw data from the time-of-flight imaging device, the raw data comprising a plurality of points in space measured by the time-of-flight imaging device and indicating a current state of deformation of the deformable membrane due to contact with the manipuland; and
determining, by the processing device, the deformation of the deformable membrane that approximates a current configuration in a least squares sense while satisfying a discrete physical model enforced as a linear constraint, wherein the linear constraint corresponds to a linearized physical model of the deformation of the deformable membrane that is discretized with a Finite Element Method (FEM).

2. The method of claim 1, wherein the reference configuration is a linear approximation to the deformation of the deformable membrane from the initial shape initially pressurized at an absolute pressure.

3. The method of claim 1, wherein the deformable membrane comprises kinematics that are approximated such that each material point $x_0$ in the reference configuration $\mathcal{S}_0$ deforms into a point x in a current configuration $\mathcal{S}$ according to the following equation:

$$x = x_0 + u(x_0)\hat{n}_0(x_0)$$

where $\hat{n}_0(x_0)$,s an outward normal to a surface of the deformable membrane in the reference configuration and $u(x_0)$ is a scalar field describing displacements in a normal direction.

4. The method of claim 1, further comprising:
discretizing the reference surface with a mesh of triangle elements defined by nodal points of a mesh; and
describing the deformation of a surface of the deformable membrane in a Lagrangian manner by a motion of mesh nodal points in the reference surface to nodal positions in a current surface configuration.

5. A sensing system comprising:
at least one deformable sensor comprising:
a deformable membrane, and
a time-of-flight imaging device;
a processing device communicatively coupled to the time-of-flight imaging device; and
a non-transitory, processor-readable storage medium communicatively coupled to the processing device, the non-transitory, processor-readable storage medium comprising one or more programming instructions thereon that, when executed, cause the processing device to:
generate a reference configuration comprising a plurality of reference points in space, the reference configuration corresponding to an initial shape of the deformable membrane prior to contact with the manipuland,
receive raw data from the time-of-flight imaging device, the raw data comprising a plurality of points in space measured by the time-of-flight imaging device and indicating a current state of deformation of the deformable membrane due to contact with the manipuland, and determine the deformation of the deformable membrane that approximates a current configuration in a least squares sense while satisfying a discrete physical model enforced as a linear constraint, wherein the linear constraint corresponds to a linearized physical model of the deformation of the deformable membrane that is discretized with a Finite Element Method (FEM).

6. The sensing system of claim 5, least one deformable sensor further comprises one or more internal sensors that detect a general deformation of the deformable membrane through a medium within the at least one deformable sensor.

7. The sensing system of claim 5, wherein the programming instructions that, when executed, cause the processing device to estimate the deformation and the field of contact forces by solving the least squares formulation further cause the processing device to:

solve an inverse model cast in the following formulation as the sparse quadratic program:

$$\underset{x = [u,\ p_c,\ p_v]}{\mathrm{argmin}} \quad \frac{1}{2}u^T Q u + f^T u,$$

$$\text{s.t.} \quad Ku + \mathrm{diag}(A)p_c = A p_v,$$

$$\frac{P_0}{3V_0} A^T u + p_v = 0,$$

$$p_c > 0,$$

where u is a vector of nodal membrane displacements in a normal direction, $p_c$ represents vector nodal contact pressures, $p_v$ represents internal pressure changes from an internal pressure $P_0$ in the reference configuration, T refers to a matrix transpose operator, Q is a Hessian of a cost, f corresponds to a linear term of the cost, K is a stiffness matrix of the discrete physical model, and $V_0$ is an internal sensor volume in the reference configuration.

8. The sensing system of claim 7, wherein the programming instructions that, when executed, cause the processing device to estimate the deformation and the field of contact forces by solving the least squares formulation further cause the processing device to:

identify a contact patch from the inverse model, wherein the contact patch comprises points of a mesh that have a non-zero contact pressure;

apply an ICP pose estimator to estimate the shape and the pose of the manipuland based on the contact patch.

9. The sensing system of claim 5, wherein the reference configuration is a linear approximation to the deformation of the deformable membrane from the initial shape initially pressurized at an absolute pressure.

10. The sensing system of claim 5, wherein the deformable membrane comprises kinematics that are approximated such that each material point $x_0$ in the reference configuration $\mathcal{S}_0$ deforms into a point x in a current configuration $\mathcal{S}$ according to the following equation:

$$x = x_0 + u(x_0)\hat{n}_0(x_0)$$

where $\hat{n}_0(x_0)$ is an outward normal to a surface of the deformable membrane in the reference configuration and $u(x_0)$ is a scalar field describing displacements in a normal direction.

11. The sensing system of claim 5, wherein the non-transitory, processor-readable storage medium further comprises one or more additional programming instructions that, when executed, cause the processing device to:

discretize the reference surface with a mesh of triangle elements defined by nodal points of a mesh; and describe the deformation of a surface of the deformable membrane in a Lagrangian manner by a motion of mesh nodal points in the reference surface to nodal positions in a current surface configuration.

12. A robot system comprising:

a robot comprising an end effector having at least one deformable sensor thereon, the at least one deformable sensor comprising:

a deformable membrane, and a time-of-flight imaging device;

a processing device communicatively coupled to the time-of-flight imaging device; and a non-transitory, processor-readable storage medium communicatively coupled to the processing device, the non-transitory, processor-readable storage medium comprising one or more programming instructions thereon that, when executed, cause the processing device to:

generate a reference configuration comprising a plurality of reference points in space, the reference configuration corresponding to an initial shape of the deformable membrane prior to contact with a manipuland, receive raw data from the time-of-flight imaging device, the raw data comprising a plurality of points in space measured by the time-of-flight imaging device and indicating a current state of deformation of the deformable membrane due to contact with the manipuland, and determine the deformation of the deformable membrane that approximates a current configuration in a least squares sense while satisfying a discrete physical model enforced as a linear constraint, wherein the linear constraint corresponds to a linearized physical model of the deformation of the deformable membrane that is discretized with a Finite Element Method (FEM).

13. The robot system of claim 12, wherein the at least one deformable sensor further comprises one or more internal sensors that detect a general deformation of the deformable membrane through a medium within the at least one deformable sensor.

14. The robot system of claim 13, wherein the one or more internal sensors comprise a compound internal sensor.

15. The robot system of claim 12, further comprising:

a base portion; and at least one second deformable sensor positioned on the base portion.

16. The robot system of claim 12, wherein the programming instructions that, when executed, cause the processing device to estimate the deformation and the field of contact forces by solving the least squares formulation further cause the processing device to:

solve an inverse model cast in the following formulation as the sparse quadratic program:

$$\underset{x = [u,\ p_c,\ p_v]}{\mathrm{argmin}} \quad \frac{1}{2}u^T Q u + f^T u,$$

s.t. $Ku + \text{diag}(A)p_c = Ap_v,$ $$\frac{P_0}{3V_0}A^T u + p_v = 0,$$

$$p_c > 0,$$

where u is a vector of nodal membrane displacements in a normal direction, $p_c$ represents vector nodal contact pressures, $p_v$ represents internal pressure changes from an internal pressure $P_0$ in the reference configuration, T refers to a matrix transpose operator, Q is a Hessian of a cost, f corresponds to a linear term of the cost, K is a stiffness matrix of the discrete physical model, and $V_0$ is an internal sensor volume in the reference configuration.

17. The robot system of claim 16, wherein the programming instructions that, when executed, cause the processing device to estimate the deformation and the field of contact forces by solving the least squares formulation further cause the processing device to:
identify a contact patch from the inverse model, wherein the contact patch comprises points of a mesh that have a non-zero contact pressure;
apply an ICP pose estimator to estimate the shape and the pose of the manipuland based on the contact patch.

18. The robot system of claim 16, wherein the non-transitory, processor-readable storage medium further comprises one or more additional programming instructions that, when executed, cause the processing device to:
discretize the reference surface with a mesh of triangle elements defined by nodal points of a mesh; and
describe the deformation of a surface of the deformable membrane in a Lagrangian manner by a motion of mesh nodal points in the reference surface to nodal positions in a current surface configuration.

* * * * *

UNITED STATES PATENT AND TRADEMARK OFFICE
CERTIFICATE OF CORRECTION

PATENT NO. : 12,048,998 B2
APPLICATION NO. : 18/202721
DATED : July 30, 2024
INVENTOR(S) : Naveen Kuppuswamy et al.

It is certified that error appears in the above-identified patent and that said Letters Patent is hereby corrected as shown below:

In the Specification

In Column 23, Line(s) 62, delete "$(\hat{n}_r \cdot \hat{n}_{0,r}) S_r^T$" and insert --$(\hat{r}_r \cdot \hat{n}_{0,r}) S_r^T$--, therefor.

In the Claims

In Column 28, Line(s) 34, Claim 3, delete "$\hat{n}_0(x_0)_i s$" and insert --$\hat{n}_0(x_0)$ is--, therefor.

In Column 29, Line(s) 61, Claim 10, delete "$\hat{n}_0(x_0)_i s$" and insert --$\hat{n}_0(x_0)$ is--, therefor.

Signed and Sealed this
First Day of October, 2024

Katherine Kelly Vidal
*Director of the United States Patent and Trademark Office*